United States Patent [19]
Qureshi et al.

[11] Patent Number: 5,790,871
[45] Date of Patent: Aug. 4, 1998

[54] SYSTEM AND METHOD FOR TESTING AND DEBUGGING A MULTIPROCESSING INTERRUPT CONTROLLER

[75] Inventors: Qadeer Qureshi, Round Rock; Steve Ennis; Michael T. Wisor, both of Austin, all of Tex.

[73] Assignee: Advanced Micro Devices, Sunnyvale, Calif.

[21] Appl. No.: 649,536

[22] Filed: May 17, 1996

[51] Int. Cl.$^6$ ............................ G06F 9/46; G06F 11/263
[52] U.S. Cl. ................... 395/733; 395/183.06; 395/500; 364/579
[58] Field of Search ..................... 395/733, 183.06, 395/183.01, 500, 739, 741; 364/579, 580; 371/27

[56] References Cited

U.S. PATENT DOCUMENTS

| | | | |
|---|---|---|---|
| 5,193,195 | 3/1993 | Miyazaki | 395/735 |
| 5,280,618 | 1/1994 | Takagi | 395/733 |
| 5,592,674 | 1/1997 | Gluska et al. | 395/742 |

Primary Examiner—Gopal C. Ray
Attorney, Agent, or Firm—Conley, Rose & Tayon; B. Noel Kivlin

[57] ABSTRACT

A processing system comprising at least one processing unit, a plurality of I/O devices, and a central interrupt control unit intercoupling the processing unit and the plurality of I/O devices. The central interrupt control unit is configured to receive interrupt signals from the I/O devices and is configured to distribute said interrupt signals to the processing unit. The central interrupt control unit is further configured to provide a signal simulative of an interrupt signal to simplify the testing process.

18 Claims, 28 Drawing Sheets

Interrupt Channel Control Register

CIG IPI Register

SYSTEM AND METHOD FOR TESTING AND DEBUGGING A MULTIPROCESSING INTERRUPT CONTROLLER

BACKGROUND OF THE INVENTION

1. Field of the Invention

This invention relates to computer systems and more particularly to a system and method for testing and debugging a multiprocessing interrupt controller.

2. Description of the Relevant Art

Computer systems employing multiple processing units hold a promise of economically accommodating performance capabilities that surpass those of current single-processor based systems. Within a multiprocessing environment, rather than concentrating all the processing for an application in a single processor, tasks are divided into groups or "threads" that can be handled by separate processors. The overall processing load is thereby distributed among several processors, and the distributed tasks may be executed simultaneously in parallel. The operating system software divides various portions of the program code into the separately executable threads, and typically assigns a priority level to each thread.

FIG. 1 is a block diagram of a so-called symmetrical multiprocessing system 10 including a plurality of processing units 12A–12C. Each processing unit 12A–12C includes a processing core 14A–14C, a cache memory 16A–16C, and a bus interface 18A-18C, respectively. The processing units 12A–12C are coupled to a main memory 20 via a system bus 22. A pair of I/O devices 24 and 26 are further coupled to system bus 22.

The multiprocessing system 10 of FIG. 1 is symmetrical in the sense that all processing units 12A–12C share the same memory space (i.e., main memory 20) and access the memory space using the same address mapping. The multiprocessing system 10 is further symmetrical in the sense that all processing units 12A–12C share equal access to the same I/O subsystem.

In general, a single copy of the operating system software as well as a single copy of each user application file is stored within main memory 20. Each processing unit 12A–12C executes from these single copies of the operating system and user application files. Although processing cores 14A–14C may be executing code simultaneously, it is noted that only one of the processing units 12A–12C may assume mastership of the system bus 22 at a given time. Thus, a bus arbitration mechanism (not shown) is provided to arbitrate concurrent bus requests of two or more processing units and to grant mastership to one of the processing units based on a predetermined arbitration algorithm. A variety of bus arbitration techniques are well-known.

An important consideration with respect to symmetrical multiprocessing systems is the handling and distribution of interrupts generated by various system resources. For example, in the system of FIG. 1, I/O devices 24 and 26 may each assert a respective interrupt signal based on the occurrence (or non-occurrence) of a particular event. As will be appreciated by those of skill in the art, interrupts are routinely generated by system resources such as keyboard devices, printers, and timers, among other things. Many systems also accommodate software interrupts whereby an interrupt may be asserted in response to software command. Due to the number of different interrupts that may occur within a system, it is desirable to provide a mechanism to efficiently manage and distribute the interrupts to achieve optimal system performance and bus utilization.

One technique for handling interrupts employs a centralized interrupt controller that is capable of receiving a plurality of interrupts and of prioritizing and distributing the interrupts amongst the various processing units. As can readily be appreciated, a properly functioning multiprocessing interrupt controller is required to process a complex array of signals and interface with a large number of logical units. Accordingly, the testing and debugging of a multiprocessing interrupt controller is generally complex and difficult. Typically, an external stimulus is provided from an external source into the multiprocessing interrupt controller, which requires a complex test apparatus. To verify the correctness of the result, a multiprocessing environment is generally employed. Thus, each of the processing units within the test environment must run independently and verify the correctness of the provided stimulus. Accordingly, there is a need for a more efficient and reliable method of testing a multiprocessing interrupt controller.

SUMMARY OF THE INVENTION

The problems outlined above are in large part solved by a symmetrical multiprocessing system in accordance with the present invention. In one embodiment, a symmetrical multiprocessing system is provided that includes a centralized interrupt control unit. The interrupt control unit is coupled to a plurality of processing units and to a plurality of interrupt sources.

Dedicated test registers are provided to provide control and stimulus for testing and debugging. Doing so enhances the testing process, in that no external stimulus is required. Moreover, provision of the internal test registers ensures that the testing may be done in stages, such that a defective portion of the multiprocessing controller may be more easily isolated.

In addition, a mechanism is provided wherein a multiprocessing environment may be simulated by a single processor during testing so as to simplify the testing procedure. The single processor will, upon reset, release the other processors and activate a test mode. While in test mode, the master test processor will assert various test interrupts and read and monitor the results of the testing. In addition, it may provide the appropriate interrupt acknowledges from the other processors, as well as reading the interrupt vectors. To the interrupt controller, the master test processor appears to be a plurality of processors.

Broadly speaking, the present invention contemplates a processing system comprising at least one processing unit, a plurality of I/O devices, and a central interrupt control unit intercoupling the processing unit and the plurality of I/O devices. The central interrupt control unit is configured to receive interrupt signals from the I/O devices and is configured to distribute said interrupt signals to the processing unit. The central interrupt control unit is further configured to provide a signal simulative of interrupt signals.

An interrupt control unit for a symmetrical multiprocessing system according to one embodiment of the present invention comprises a plurality of interrupt input channels for receiving interrupt signals and a plurality of interrupt output channels configured to provide the interrupt signals to a plurality of processors. A central interrupt controller is operatively coupled to the plurality of interrupt input channels and is configured to selectively provide a given interrupt signal to one of the interrupt output channels. Finally, a testing mechanism configured to provide test interrupt signals to the plurality of interrupt input channels simulative of said interrupt signals is provided.

BRIEF DESCRIPTION OF THE DRAWINGS

Other objects and advantages of the invention will become apparent upon reading the following detailed description and upon reference to the accompanying drawings in which.

Figure 1:
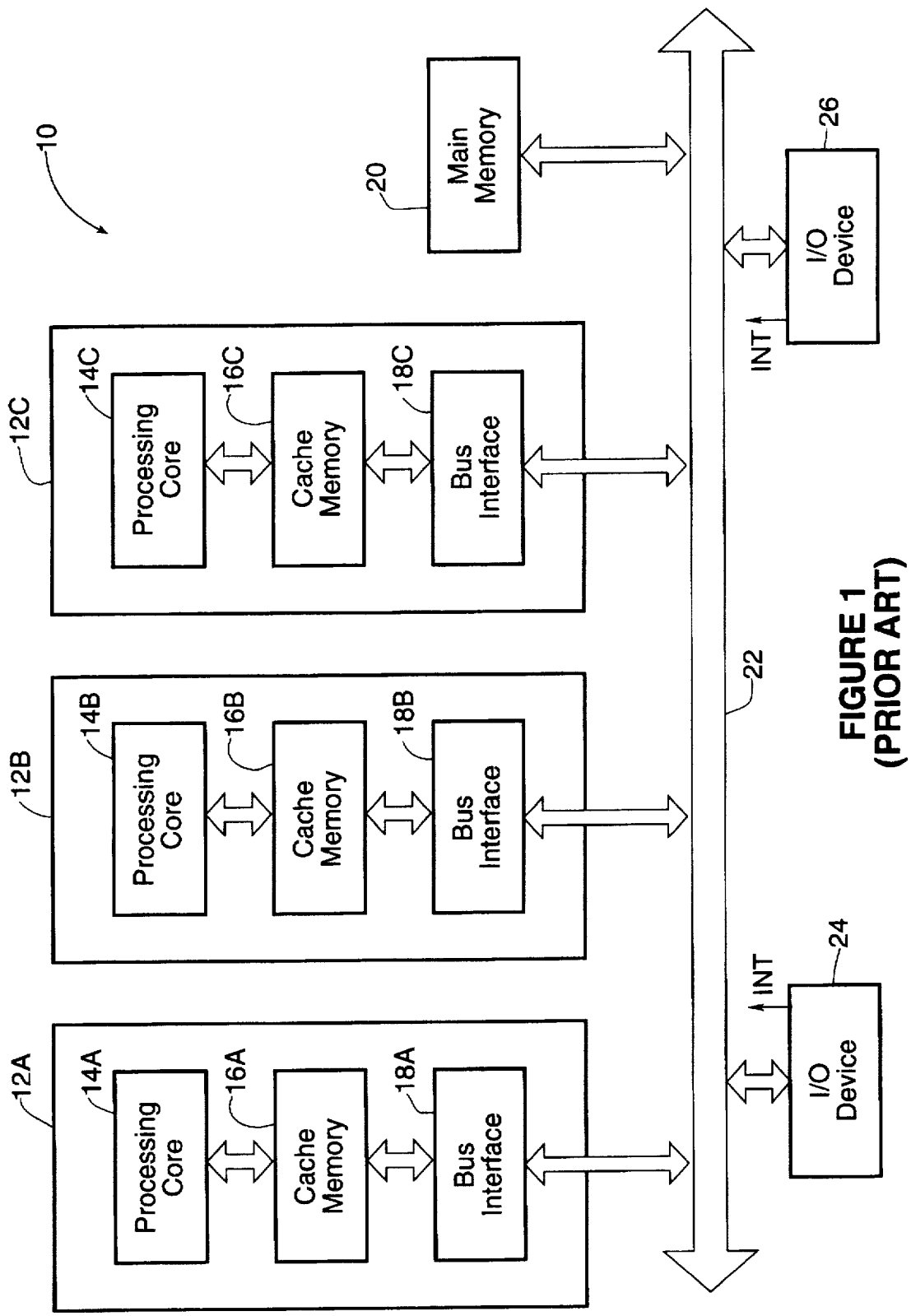
FIG. 1 is a block diagram of a typical symmetrical multiprocessing system including a plurality of processing units.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
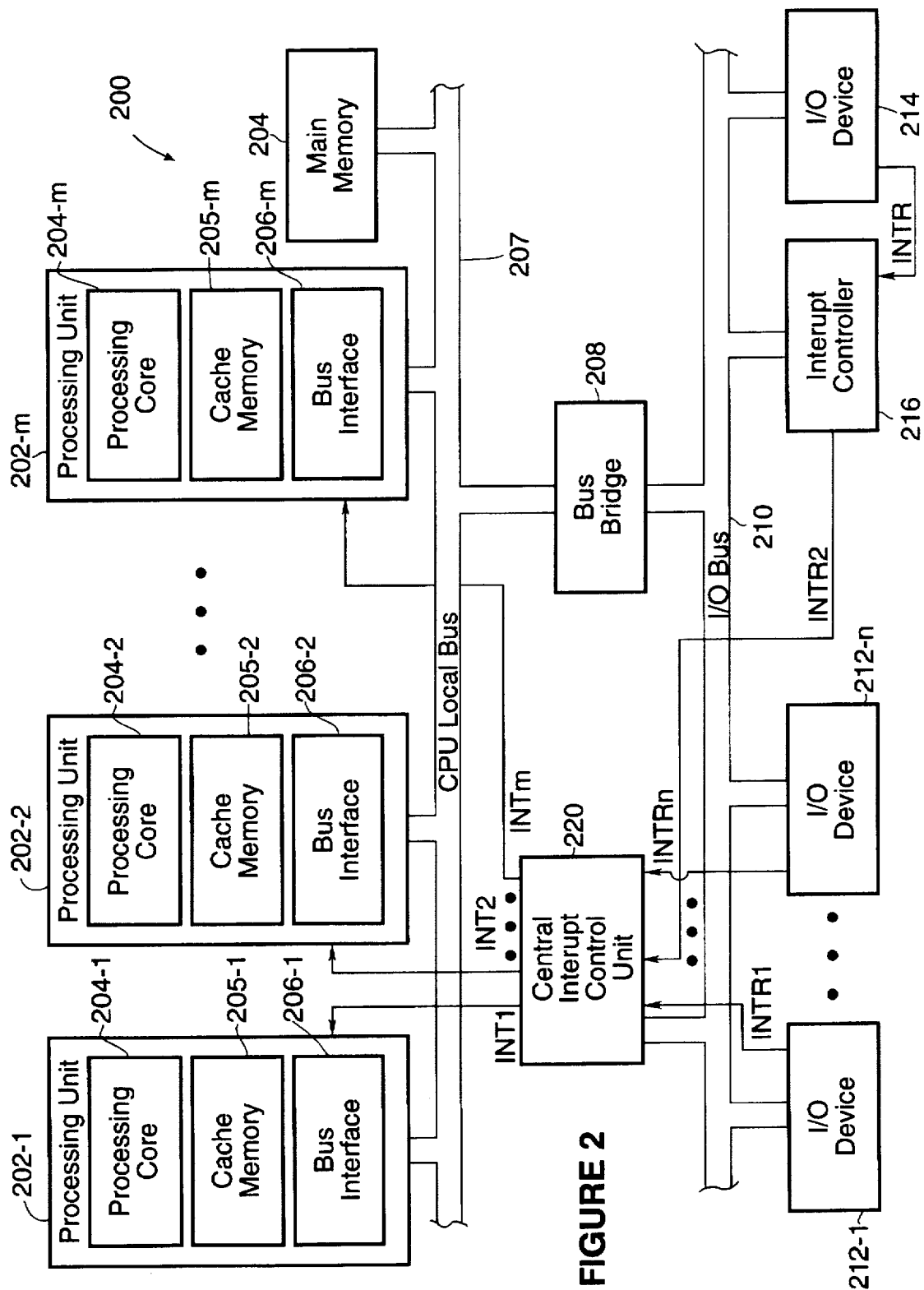
FIG. 2 is a block diagram of a symmetrical multiprocessing system including a centralized interrupt controller mechanism according to one embodiment of the present invention.

Referring next to FIG. 2, a block diagram is shown of a symmetrical multiprocessing system 200 including a centralized interrupt controller mechanism. The system 200 includes a plurality of processing units 202-1 through 202-m coupled to a main memory 204 via a CPU local bus 207. Each processing unit 202-1 through 202-m includes a respective processing core 204-1 through 204-m, a respective cache memory 205-1 through 205-m, and a respective bus interface 206-1 through 206-m. A bus bridge 208 couples CPU local bus 207 to an I/O bus 210. A plurality of I/O peripheral devices 212-1 through 212-n are coupled to I/O bus 210. An additional I/O device 214 and an interrupt controller 216 are further coupled to I/O bus 210. I/O devices 212-1 through 212-n are coupled to a central interrupt control unit 220. I/O devices 212-1 through 212-n and 214 are accessible by each of the processing units 202-1 through 202-m through the bus bridge 208.

The central interrupt control unit 220 is provided to manage interrupts received from I/O devices 212-1 through 212-n and interrupt controller 216, and to distribute the interrupts among the processing units 202-1 through 202-m. The central interrupt control unit 220 further manages interprocessor interrupts and software interrupts generated by the processing units 202-1 through 202-m. In its preferred form, the central interrupt control unit 220 is implemented with a variety of programmable features as discussed below to accommodate optimal system flexibility.

I/O bus 210 may be any suitable bus for coupling peripheral devices such as CD-ROM units, local area network (LAN) devices, and printers to computer system 200. Exemplary peripheral bus standards include the ISA (industry standard architecture) bus, the EISA (extended industry standard architecture) bus and the PCI (peripheral component interconnect) bus. Bus bridge 208 provides an interface between I/O bus 210 and CPU local bus 207.

Processing cores 204-1 through 204-m are data processing units which operate according to a predetermined instruction set. Exemplary processing units include model 80486 processing units, Pentium compatible processing units, and PowerPC processing units. It is understood, however, that processing units 202-1 through 202-m could operate in accordance with still other instruction sets.

Cache memories 205-1 through 205-m are implemented using high speed memory devices. Each cache memory 205-1 through 205-m is associated with a cache controller (not shown separately in the figure) that orchestrates and manages the transfer of data between the associated processing core 204-1 through 204-m, the associated cache memory 205-1 through 205-m, and CPU local bus 207. In the preferred form, the cache controller of each processing unit operates concurrently with the associated processing core to provide maximum sustained performance.

CPU local bus 207 has a predetermined bit width and is the computer system's primary bus. Main memory 204 is physical memory of a predetermined size and may be implemented with DRAM (dynamic random access memory). A memory controller (not shown separately) is associated with main memory 204 which controls and orchestrates the transfer of data, address, and control signals communicating between CPU local bus 207 and main memory 204.

Interrupt controller 216 is provided for sorting and managing interrupt signals derived from a variety of interrupt sources, such as I/O device 214. Interrupt controller 216 is illustrative of, for example, a model 8259A series programmable interrupt controller manufactured by Advanced Micro Devices, Inc. The 8259A programmable interrupt controller is described within the publication "MOS Microprocessors and Peripherals"; pp. 3–371 through 3–388 (Advanced Micro Devices, Inc. 1987).

Before proceeding with a detailed discussion of central interrupt control unit 220, it is noted at the onset that a variety of configuration registers are embodied within the central interrupt control unit 220. These configuration registers may be programmed and accessed via I/O bus 210. Accordingly, the central interrupt controller 220 is independent of the type of CPU local bus 207, and thus may be employed within a variety of systems using differing types of processing units. As a result, the central interrupt control unit 220 may be used in conjunction with and is compatible with a variety of multiprocessing systems.

Figure 3:
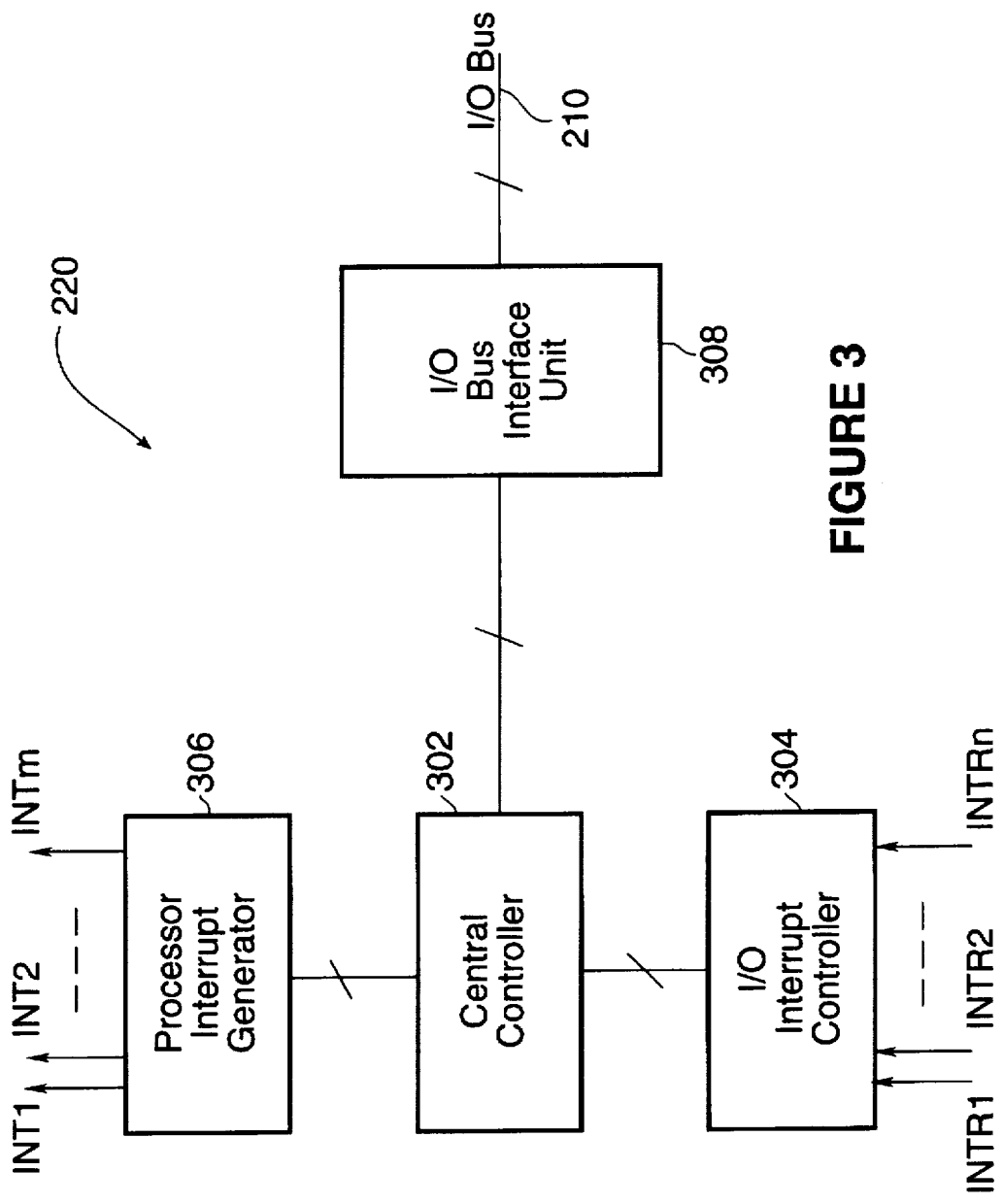
FIG. 3 is a block diagram of a central interrupt control unit.

Referring next to FIG. 3, details regarding the central interrupt control unit 220 are next considered. FIG. 3 is a block diagram of one embodiment of central control unit 220 including a central controller 302 coupled to an I/O interrupt controller 304 and to a processor interrupt generator 306. An I/O bus interface unit 308 is further shown coupled to central controller 302.

I/O bus interface unit 308 provides an interface between I/O bus 210 and central controller 302 to allow programming of the central control unit 220, as well as to accommodate other functions of the central control unit 220, as will be explained in greater detail below. It is understood that the central interrupt control unit 220 could alternatively or additionally include a CPU bus interface unit for coupling the CPU local bus 206 to the central control unit 220 for programming and other functions.

As explained previously, the central interrupt control unit 220 is capable of accepting interrupts from a variety of different I/O devices. These interrupts are received at a plurality of interrupt pins, labeled INTR1-INTRn, and are provided to I/O interrupt controller 304. The central interrupt control unit 220 is configured such that each interrupt INTR1-INTRn can be individually programmed to designate a specific type of interrupt, to specify a particular delivery mode, and to indicate its priority level. In addition, each interrupt pin can be utilized in a cascaded mode to expand the number of interrupt signals which can be received and identified at the particular pin. This will be explained further below.

Central controller 302 prioritizes the various interrupt signals and routes them to the processor interrupt generator 306, which responsively routes the interrupt signals to one or more of the processing units 202-1 through 202-m based on the delivery mode for each interrupt and the current task priority of each processing unit, among other things. The central controller 302 maintains an interrupt stack and a device table for the system, and further maintains the current task priorities of all processing units. The central controller 302 finally includes a mechanism for distributing selected interrupts that need to be handled by all processors in a broadcast fashion. This distribution mechanism will be explained in greater detail below.

As stated previously, processor interrupt generator 306 routes the various interrupts to a designated destination processing unit (or processing units). In this embodiment, the central interrupt control unit 220 is configured to distribute interrupts among a maximum of 256 processing units. The number of processing units provided within the system is programmed upon system initialization, as will be understood from the description below.

Figure 4:
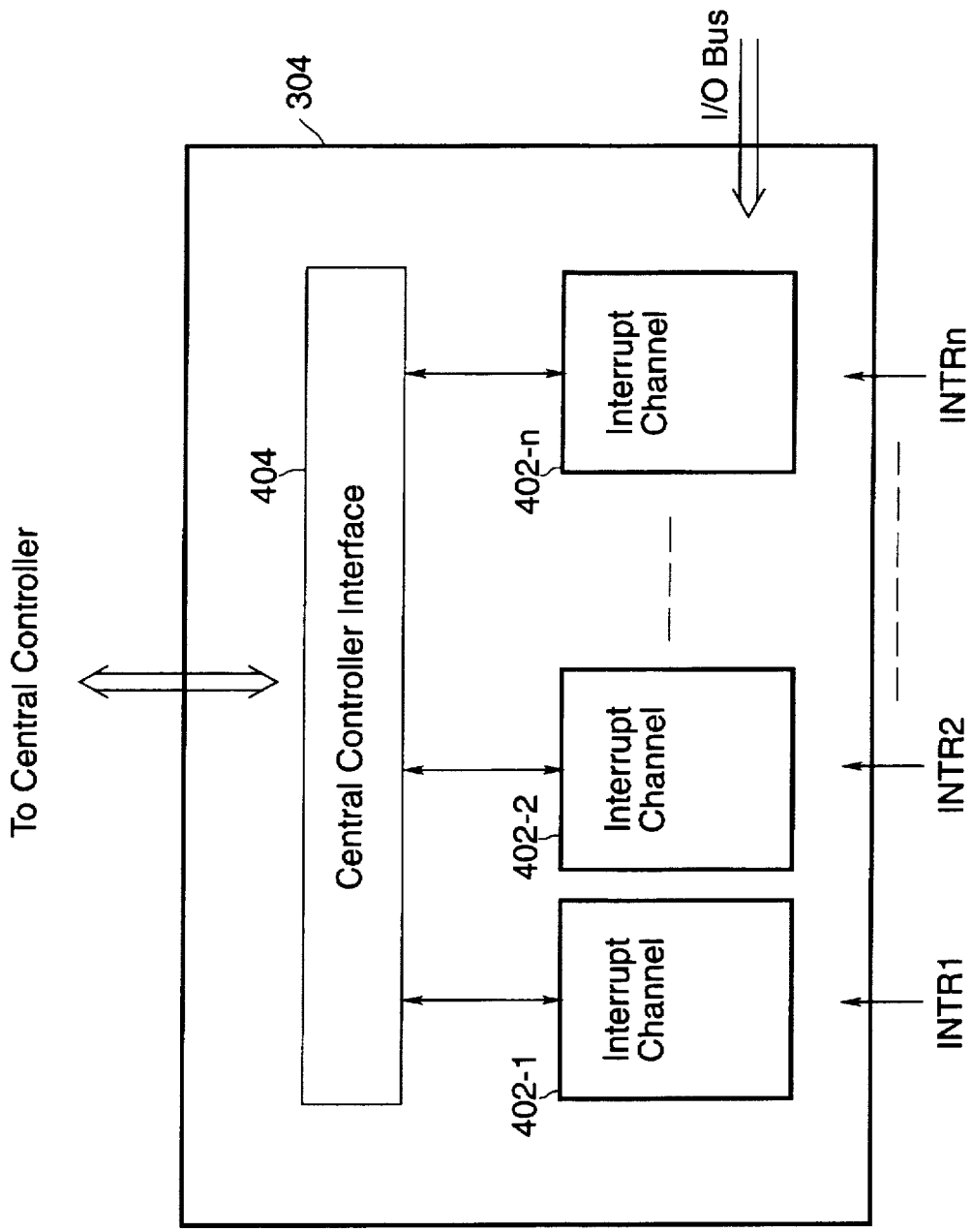
FIG. 4 is a block diagram of an I/O interrupt controller.

FIG. 4 is a block diagram of I/O interrupt controller 304. The I/O interrupt controller 304 receives interrupts from I/O devices via pins INTR1, INTR2, . . . INTRn. The I/O interrupt controller 304 includes a plurality of interrupt channels 402-1 through 402-n coupled to pins INTR1-INTRn, respectively. A central controller interface 404 is coupled to each to interrupt channel 402-1 through 402-n. The interrupt channels 402-1 through 402-n provide dedicated channels through which interrupts received at the associated interrupt pins INTR1-INTRn, respectively, are processed. In one embodiment, the I/O interrupt controller 304 includes a total of sixteen interrupt input pins, each of which can be cascaded with sixteen interrupt signals to support a maximum of 256 unique interrupt vectors.

A plurality of registers (not shown in FIG. 4) are provided within each interrupt channel 402-1 through 402-n to control the processing of each incoming interrupt. These registers are mapped either within the memory space or the I/O space of the system. Further details regarding the internal registers of interrupt channels 402-1 through 402-n are provided below.

Each interrupt channel 402-1 through 402-n detects the assertion of an interrupt signal at its associated input pin INTR1-INTRn and processes the interrupt signal to verify whether the interrupt should be dispatched to the processing units. Interrupt characteristics can be programmed individually, and implied positional dependence is not attached to any of the interrupt channels 402-1 through 402-n.

Figure 5:
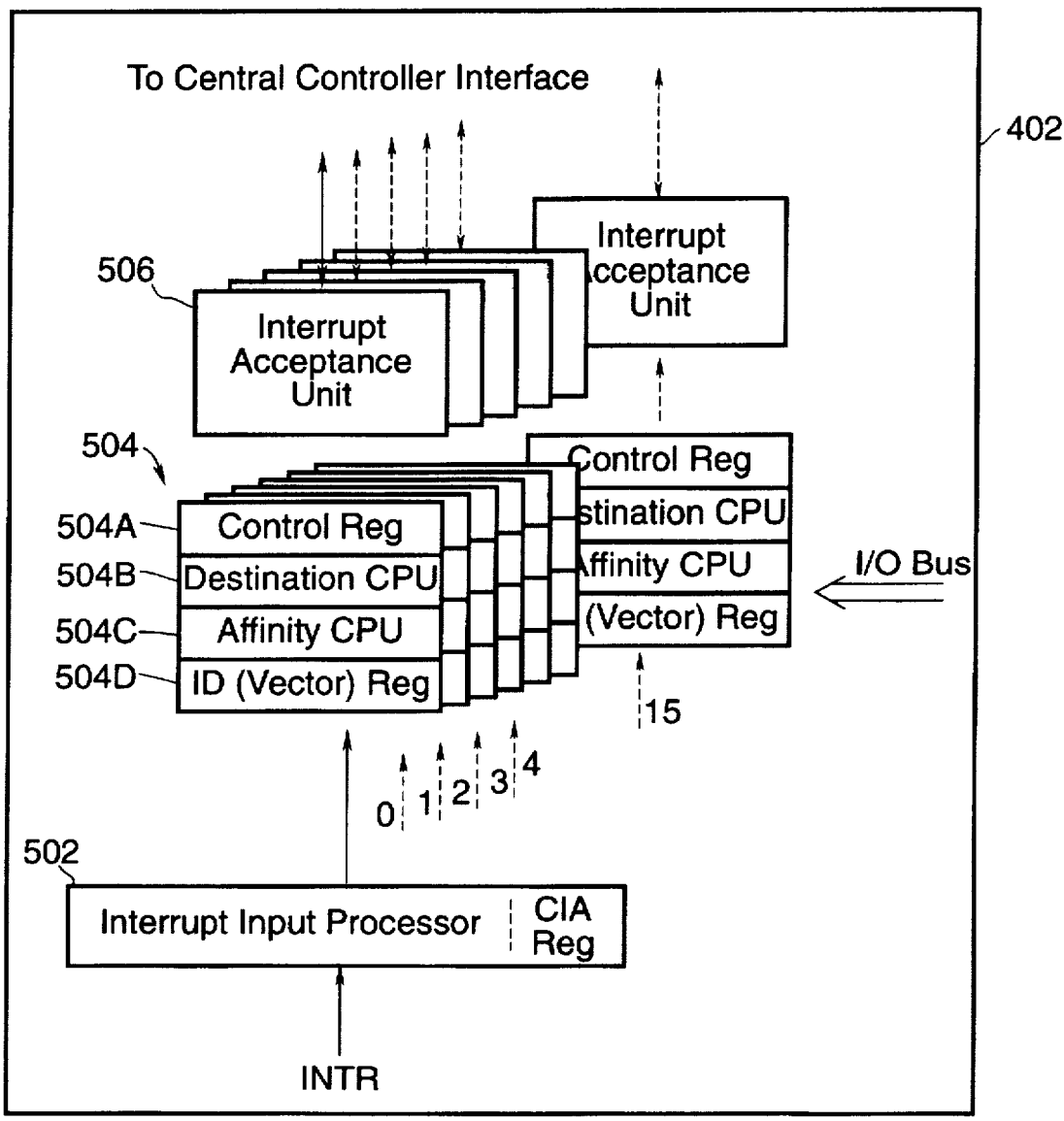
FIG. 5 is a block diagram illustrative of an interrupt channel.

FIG. 5 is a block diagram illustrative of each of the interrupt channels 402-1 through 402-n. The interrupt channel 402 of FIG. 5 includes an interrupt input processor 502 coupled to a registers unit 504 and an interrupt acceptance unit 506. The interrupt input processor 502 processes the interrupt signal (or signals, if cascade mode is programmed) on the INTR pin and determines the mode of transfer for cascaded interrupts. If the pin is programmed to be a cascaded pin, the index of the current cascaded interrupt is determined and stored in a cascade interrupt address (CIA) register. It is noted that when the interrupt channel 402 is operated in a cascade mode, the number of registers units 504 and the number of interrupt acceptance units 506 are effectively duplicated fifteen times, such that a separate interrupt sub-channel is provided for each possible cascaded interrupt signal. These sub-channels are illustrated in phantom within FIG. 5.

Each interrupt signal is associated with a programmable control register 504A, a destination CPU register 504B, an affinity CPU register 504C, and an ID (vector) register 504D. Based on the information within the control register 504A, the interrupt acceptance unit 506 processes the signal on the INTR pin. If the interrupt is a genuine, enabled, and acceptable signal, it is passed on the central controller interface 404 (of FIG. 4) to be delivered to one or more of the processing units.

As stated previously, each INTR pin can be programmed in a cascade mode wherein the interrupt pin may receive a cascaded signal representing sixteen distinct interrupts. When a pin is programmed to be cascaded, sixteen individual sets of registers units and interrupt acceptance units will be associated with the interrupt channel, as illustrated in phantom in FIG. 5. The cascade modes of central control unit 220 will be explained in greater detail below.

Figure 6:
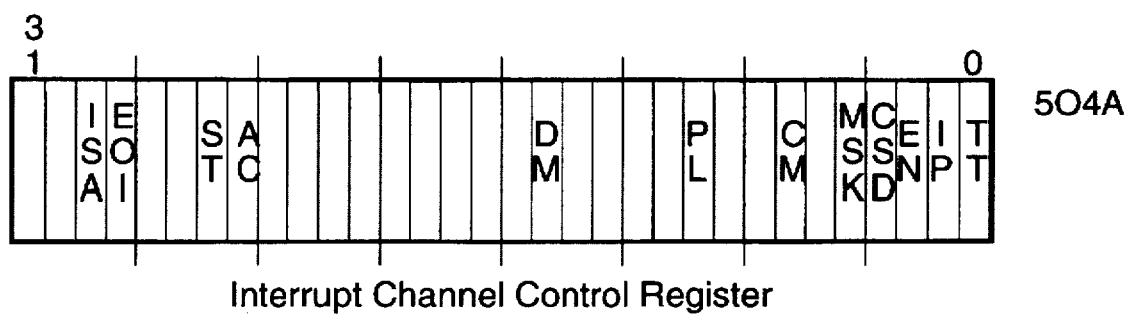
FIG. 6 is a diagram of an interrupt channel control register and its associated fields.

The various registers of each interrupt channel (or sub-channel) are next considered. As stated previously, a separate set of registers are provided for each possible interrupt signal. These registers are labeled the control register 504A, the destination CPU register 504B, the affinity CPU register 504C, and the ID register 504D. These registers are visible to software and are located in either memory mapped or I/O mapped system space. A separate control register 504A is provided for each interrupt signal and is programmable. The control register 504A for each interrupt signal defines and dictates the functionality of each INTR pin, and each may be embodied by a 32-bit register. FIG. 6 illustrates the fields associated with the control register 504A, and Table 1 describes the various fields of the control register 504A. Table 2 indicates the cascade mode encoding, Table 3 indicates the delivery mode encoding, and Table 4 indicates the status bits encoding. As indicated by Tables 1-4, the control register 504A stores various information for defining the type of interrupt signal that will be provided to the channel, the mode of the interrupt pin (i.e., normal or cascade mode), whether the interrupt signal is currently masked, the priority level associated with the interrupt, the delivery mode, along with other parameters associated with the interrupt.

TABLE 1

IIC Control Register Fields

| Field | Name | Bits | Explanation |
|---|---|---|---|
| TT | Trigger Type | 1 | Interrupt is edge triggered or level triggered |
| IP | Interrupt Polarity | 1 | Polarity of the interrupt (active high or low) |
| EN | Enable | 1 | Corresponding interrupt is being used |
| CSD | Cascade | 1 | Enables the pin to be a cascaded interrupt |
| MSK | Mask | 1 | Interrupt is masked |

TABLE 1-continued

IIC Control Register Fields

| Field | Name | Bits | Explanation |
|---|---|---|---|
| CM | Cascade Mode | 2 | Cascaded Interrupt vector delivery mode - refer to Table 2 |
| PL | Priority Level | 4 | Priority Level assigned to the interrupt |
| DM | Delivery Mode | 3 | Mode of delivering the interrupt - refer to Table 2 |
| AC | Affinity CPU | 1 | This interrupt has an affinity CPU |
| ST | Status | 2 | Current status of the interrupt - refer to Table 4 |
| EOI | EOI enabled | 1 | Enable EOI latency timer for level triggered interrupts |
| ISA | ISA mode | 2 | System is in ISA mode |

TABLE 2

Cascade Mode Definition

| CM(1:0) | Definition |
|---|---|
| 00 | Serial coded mode |
| 01 | Serial 16-bit mode |
| 10 | 8259 mode |
| 11 | TBD |

TABLE 3

Delivery Mode Definition

| DM(2:0) | Definition |
|---|---|
| 000 | Fixed: Deliver the interrupt to the CPU/CPUs in destination CPU register |
| 001 | Lowest Priority: Delivery the interrupt to the processor executing at lowest priority |
| 010 | Broadcast: Deliver the interrupt to all the CPUs |
| 011 | TBD |
| 100 | NMI: Deliver a level triggered interrupt to destination CPUs as NMI |
| 101 | Reset |
| 110 | SMI: Deliver a level triggered interrupt to destination CPUs as SMI |
| 111 | TBD |

TABLE 4

Status Bits Definition

| ST(1:0) | Definition |
|---|---|
| 00 | Idle |
| 01 | Being serviced (dispatched and acknowledged) |
| 10 | Dispatched from the CIC (but not acknowledged) |
| 11 | Queued in the CC |

Referring back to FIG. 5, the definition of the destination CPU register 504B depends on the delivery mode the current status of the associated interrupt signal. The interrupt is not being serviced, the destination CPU register 504B has the ID of the processing unit or group of processing units that the interrupt is being targeted to. If the interrupt is being serviced, the destination CPU register 504B has the ID of the processing unit that is servicing the interrupt. If the delivery mode is broadcast or lowest priority, this register conveys no associated meaning.

The affinity CPU register 504C holds the ID of the processing unit 202-1 through 202-m (FIG. 2) that serviced the interrupt most recently. The ID register 504D contains the ID (or vector) of the interrupt.

Interrupts are processed by the respective interrupt acceptance unit 506 before passing them on to the central controller 302 via central controller interface 404. If the interrupt is enabled (EN of ICR) and not masked (MSK of ICR), it is passed on to the central controller 302 along with the information about the delivery mode, destination processing unit (if any), priority level and interrupt ID.

As stated above, the architecture allows for each interrupt pin INTR1-INTRn of the central interrupt control unit 220 to be programmed as either a direct interrupt or as a cascaded interrupt. If the cascade bit in the control register 504A is set, the associated interrupt channel accommodates a total of fifteen additional expansion interrupts. Each of these expansion interrupts are associated with a dedicated interrupt control register (ICR) 504A, a destination CPU register 504B, an affinity CPU register 504C, and an ID register 504D, as illustrated in phantom in FIG. 5. Except for the fact that the CSD, CM and ISA fields of the expansion interrupt control registers are undefined, these registers are identical to the ones defined by Tables 1–4.

The CM field determines the method used to access one of sixteen interrupts in cascade mode. The index of one of sixteen interrupts is determined by the CIA register located in the interrupt input processor. The CM mode determines the mechanism of computing the CIA.

Figure 7:
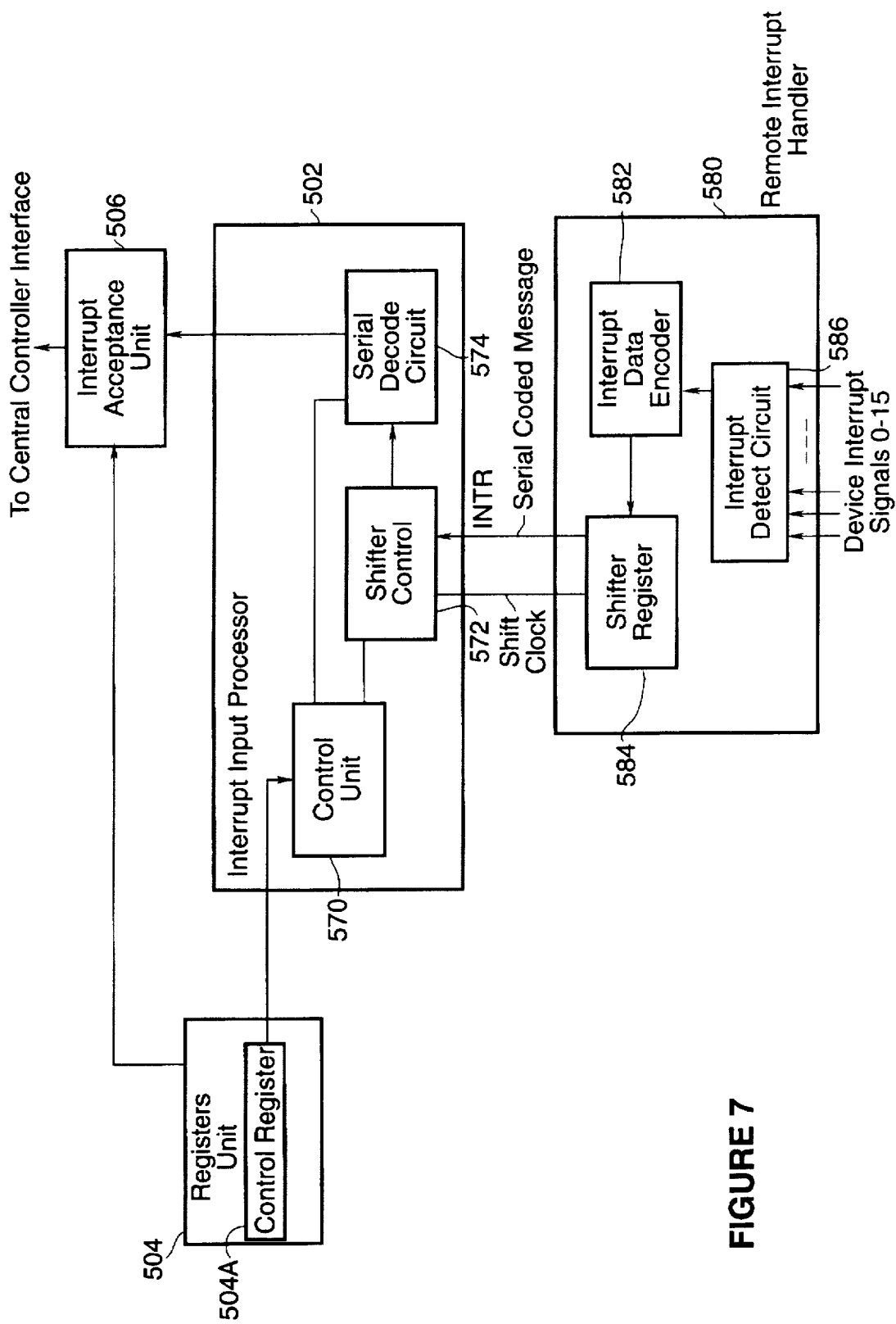
FIG. 7 is a block diagram that illustrates the hardware associated with the symmetrical multiprocessing system during one cascading mode of an interrupt input processor.
Figure 8:
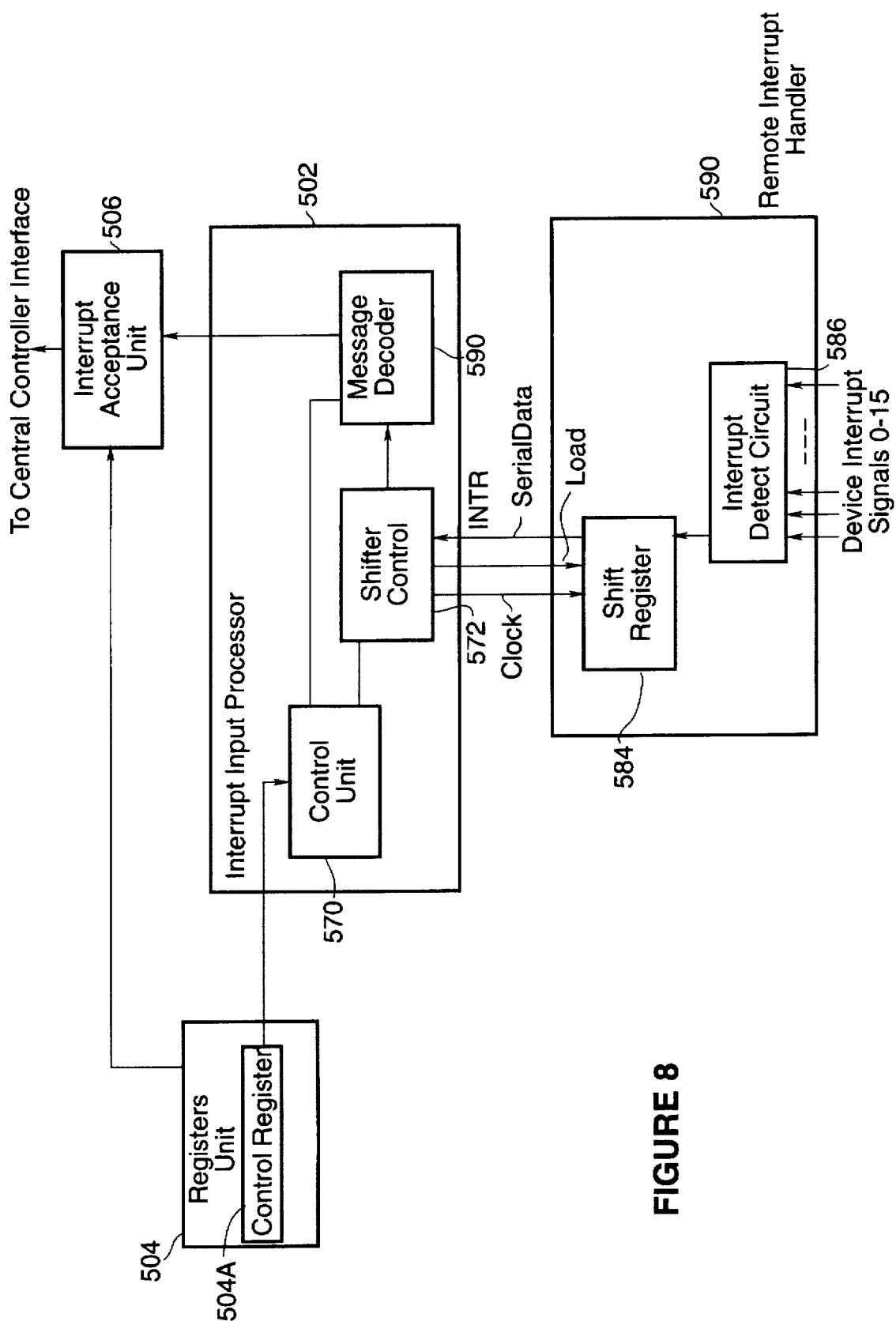
FIG. 8 is a block diagram that illustrates hardware associated with another cascading mode of the symmetrical multiprocessing system.

FIGS. 7 and 8 illustrate hardware configurations for cascading a particular pin. It is noted that the central interrupt control unit 220 supports interrupt expansion via three different cascading modes. The first two modes allow a single physical interrupt pin INTR1-INTRn to route the interrupts of multiple I/O devices to selected interrupt sub-channels. The third mode allows for the integration of a conventional 8259-type interrupt controller within the computer system. This provides traditional PC hardware and software compatibility.

Referring first to FIG. 7, a hardware configuration is illustrated for what is referred to as the "serial coded" mode. FIG. 7 is a block diagram that illustrates internal portions of the interrupt input processor 502 which are activated when the particular interrupt channel is set in the serial coded cascade mode. As illustrated in FIG. 6, the interrupt input processor 502 includes a control unit 570 coupled to a shifter control 572 and a serial decode circuit 574. The control unit 570 is responsive to the CSD and CM fields of the corresponding control register 504A. When the CM field (i.e., cascade mode field) indicates that the current mode is serial coded cascade mode, the control unit 570 activates the shifter control 572 and the serial decode circuit 574 such that serially transmitted encoded data at the corresponding interrupt pin INTR is decoded to identify activity of a particular interrupt signal. The interrupt input processor 502 is shown coupled to a remote interrupt handler 580 which includes an interrupt data encoder coupled to a shift register 584 and to a parallel interrupt detect circuit 586.

A plurality of interrupt signals 0 to 15 are provided to parallel interrupt detect circuit 586. The remote interrupt handler 580 gathers the device interrupts and communicates the status of each interrupt signal to the central interrupt control unit via a coded serial message on the INTR line of the associated interrupt channel. Parallel interrupt detect circuit 586 monitors the interrupt signals provided to the remote interrupt handler 580. If a transition occurs in any of the interrupt signals, the interrupt data encoder 582 causes an encoded serial message to be broadcast to the interrupt input processor 502 via shift register 584. The serial data is transmitted on a serial coded message line which is provided to the INTR line of the interrupt channel. The shift register 584 provides a synchronizing shift clock to the interrupt input processor 502 as each serial coded message is being transmitted.

In one embodiment, the encoded messages consist of a cascaded interrupt signal number and interrupt state in a 6-bit form. A possible encoding scheme is as follows:

| Bits 5:4 Interrupt State | 00 | interrupt transitioned to low |
|---|---|---|
| | 01 | interrupt transitioned to high |
| | 10 | reserved |
| | 11 | reserved |

Bits 3:0 interrupt number for cascaded interrupt input signals numbered 0 to 15

Consider, for example, a situation in which interrupt signal 3 transitions from low to high. This transition is detected by the parallel interrupt detect circuit 586. The interrupt data encoder 582 responsively generates an encoded value indicative of the type of transition that occurred and the particular interrupt signal that made the transition. For example, if the above coding scheme is employed, an encoded value of "010111" would represent a transition to high ("01") in interrupt signal 7 ("0111"). The encoded value is then provided to shift register 584, which initiates a serial transmission which is received by the shifter control unit 572. The serial decode unit 574 then decodes the received message in accordance with the coding scheme of the interrupt data encoder 582, and provides the message to the interrupt acceptance unit 506 of the designated interrupt sub-channel. The interrupt acceptance unit 506 for the corresponding interrupt signal then passes the interrupt on to the central controller 302 if the interrupt is enabled (EN of the control register) and not masked (MSK of control register). Similar to the previous description, when an interrupt acceptance unit 506 passes an interrupt on to the central controller 302, the interrupt is passed along with the information regarding the delivery mode, the destination CPU (if any), the priority level, and the interrupt ID for the interrupt signal.

In accordance with the serial coded cascade configuration of FIG. 7, the serial channel is active only when activity occurs on one or more of the interrupt signal lines, and thus provides a low power and electrically-quiet expansion technique. Furthermore, the encoding scheme provides reserved values to accommodate additional types of messages.

FIG. 8 is a block diagram of an alternative cascading configuration. Circuit portions that correspond to those of FIG. 7 are numbered identically. In this configuration, rather than encoding a value indicative of activity of a particular interrupt signal, the state of the parallel interrupt detect circuit 586 is communicated continuously and directly to interrupt input processor 502 via shift register 584. As such, shift register 584 continuously generates a serial signal indicative of the state of parallel interrupt detect circuit 586, and shifter control unit 572 converts the serial transmission to parallel data. The parallel data is then decoded by message decoder 590 which passes a detected interrupt signal transmission to the corresponding interrupt acceptance unit 506 along with the associated control and vector information within the corresponding registers unit 504.

In this configuration, the interrupt input processor 502 continually clocks the remote interrupt shift register 584. It must then keep track of which interrupt the current data belongs to and route it to the appropriate channel. The data is simply "interrupt high" or "interrupt low". The central controller (or interrupt acceptance unit 506) must then determine if the data represents a change in the interrupt state and therefore what action, if any, should be taken.

Figure 9:
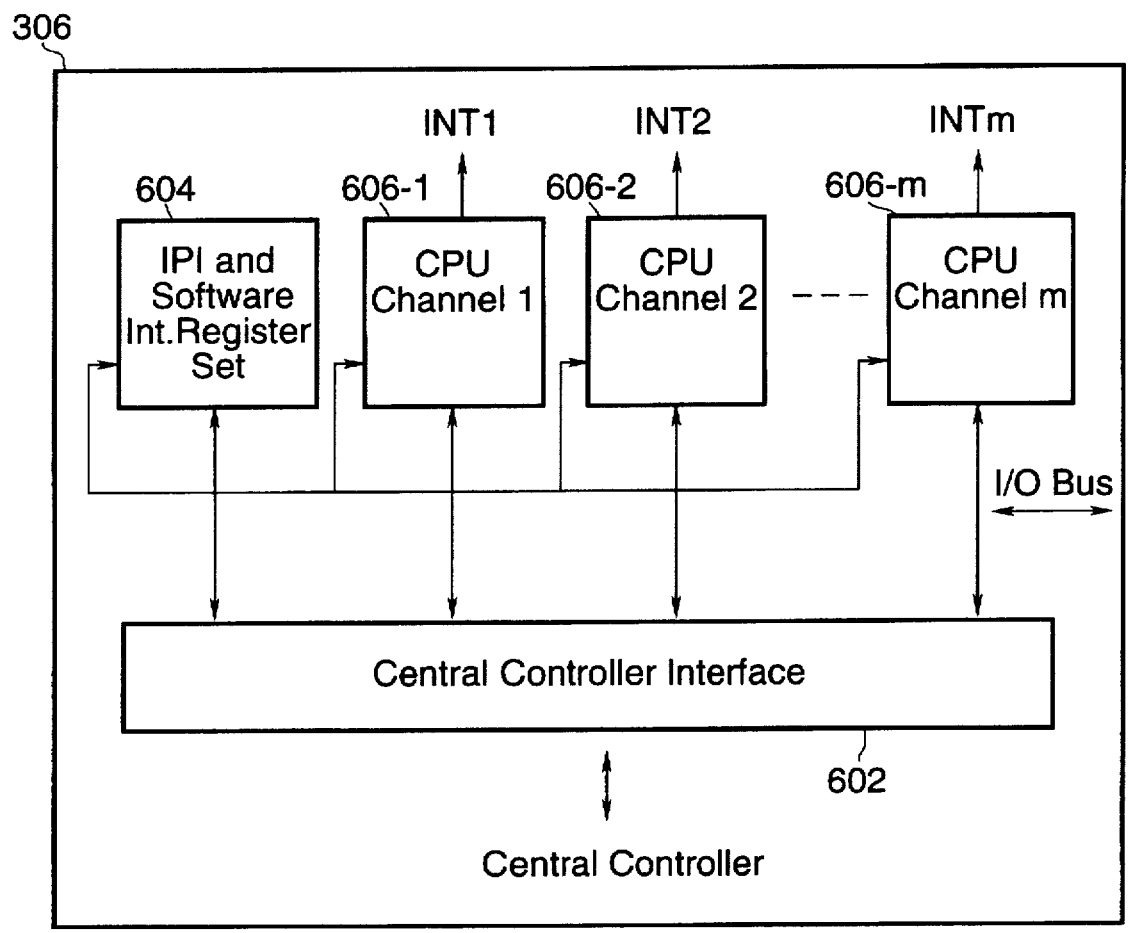
FIG. 9 is a block diagram of a processor interrupt generator.

Additional aspects of the central interrupt control unit 220 of FIG. 2 are considered next. Referring to FIG. 9, a block diagram is shown which is illustrative of the processor interrupt generator 306. As stated previously, the processor interrupt generator 306 receives interrupt information from the central controller 302 and generates processor interrupt signals labeled INT1-INTm to be delivered to the processing units. As illustrated in the figure, the processor interrupt generator 306 includes a central controller interface 602, an interprocessor interrupt (IPI) and software interrupt register set 604, and a set of CPU channels 606-1 through 606-m. Each processing unit in the system receives an interrupt from an associated CPU channel 606-1 through 606-m of the processor interrupt generator 306. The CPU channels 606-1 through 606-m receive interrupts from the central controller 302 (FIG. 3) through central controller interface 602 and dispatches them to the appropriate processing unit (or units).

Figure 10B:
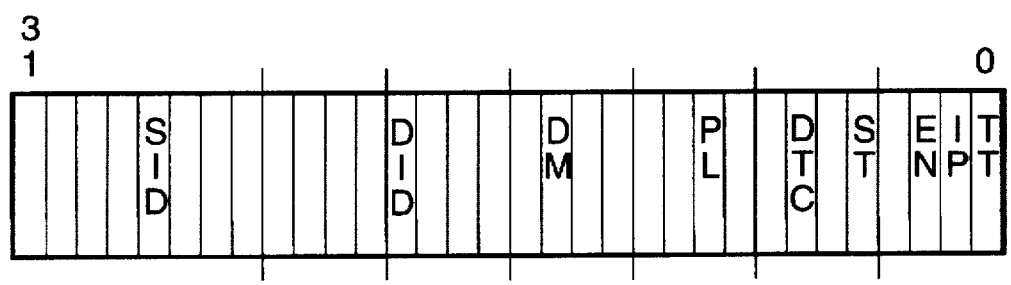
FIG. 10B is a diagram that illustrates an interprocessor interrupt register along with its associated fields.
Figure 10:
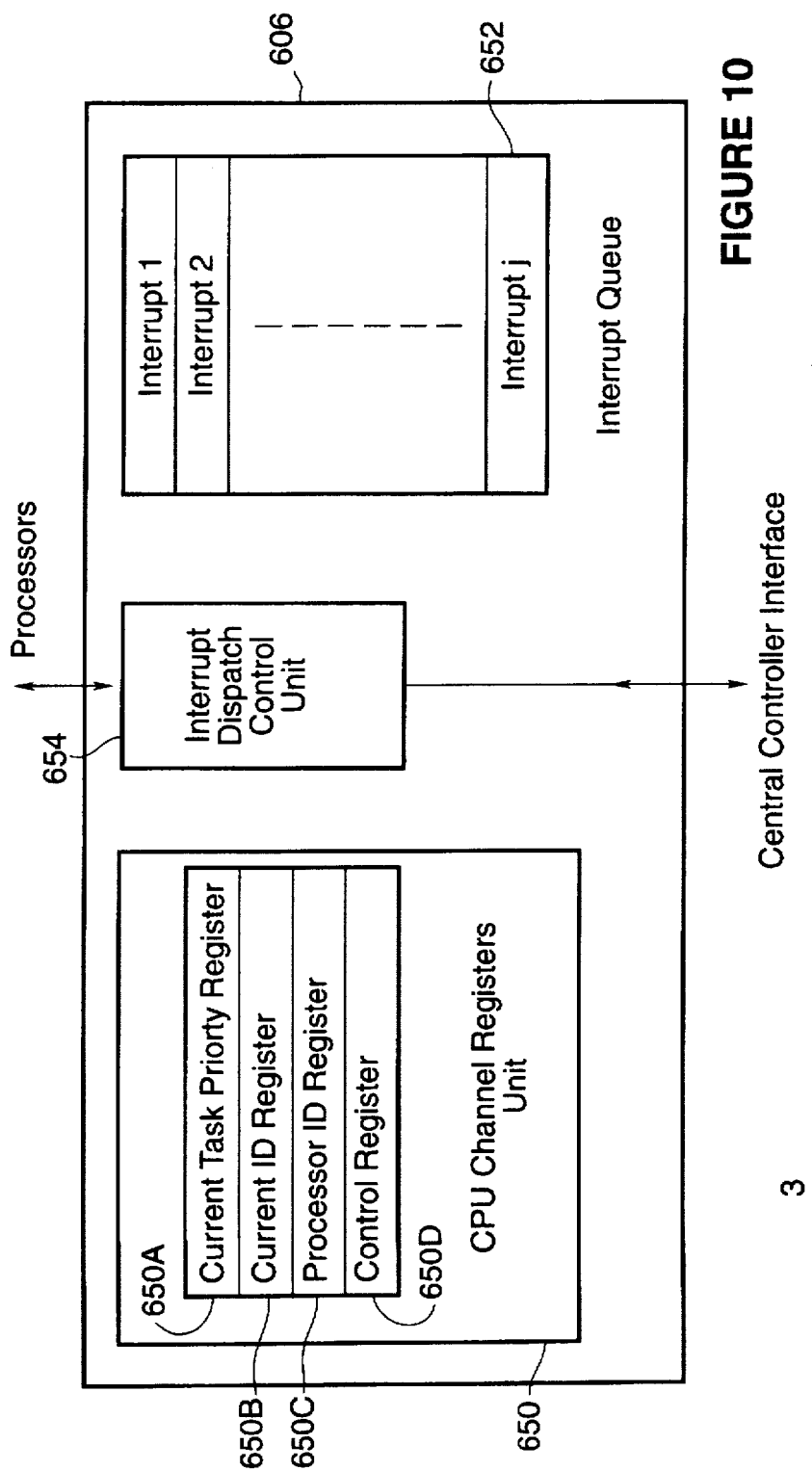
FIG. 10 is a block diagram illustrative of a processor channel.

FIG. 10 is a block diagram illustrative of each of the processor channels 606-1 through 606-m. The CPU channel 606 of FIG. 10 includes a CPU channel registers unit 650 and an interrupt queue 652 coupled to an interrupt dispatch control unit 654. The interrupt dispatch control unit 654 dispatches pending interrupts to the corresponding processing unit.

The CPU channel registers unit 650 includes a current task priority register 650A, a current interrupt ID register 650B, a processor ID register 650C, and a control register 650D. The functions and bit definitions of each of these registers is described next.

Figure 10A:
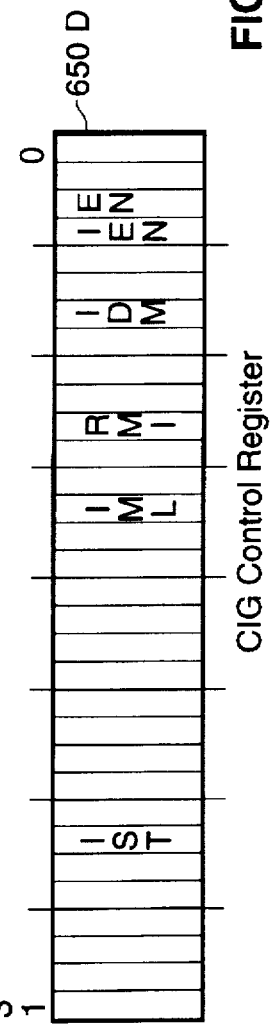
FIG. 10A is a diagram that illustrates a CPU channel control register along with its associated fields.

Each processing unit in the system is assigned a dedicated control register 650D to dictate the functionality as seen by the central interrupt control unit 220. These are 32-bit programmable registers which are mapped within either I/O or memory space of the system. FIG. 10A illustrates a CPU channel control (CIG) register 650D along with its associated fields, and Tables 5 through 7 describe each of the fields within the control register.

TABLE 5

CIG Control Register Fields

| Field | Name | Bits | Explanation |
|---|---|---|---|
| EN | Enable | 1 | This CPU channel is being used |
| IEN | Interrupt Enable | 1 | The CFU connected to this channel will accept the interrupts |
| ITM | Interrupt Transmit Mode | 2 | Mechanisms for delivering the interrupts to the CPU - refer to Table 6 |
| RMI | Real Mode Interrupt | 1 | This interrupt is delivered in "real mode" |
| IML | Interrupt Mask Level | 4 | Mask all the interrupts at or below this priority level |
| IST | Interrupt Status | 2 | Reflects the status of the interrupt on this channel - refer to Table 7 |

TABLE 6

Interrupt Transmission Mechanism Definition

| ITM(1:0) | Definition |
|---|---|
| 00 | Deliver the interrupts on separate pins |
| 01 | Deliver the interrupts on the CPU bus |
| 10 | Use dedicated interrupt delivery bus (say, 4-bit wide) to deliver the interrupts |
| 11 | TBD |

TABLE 7

Interrupt Status Definition

| IST(1:0) | Definition |
|---|---|
| 00 | No interrupt is being serviced |
| 01 | Interrupt being serviced by the CPU |
| 10 | Interrupt dispatched to the CPU, not yet acknowledged |
| 11 | TBD |

The processor ID register 650C contains the ID of the processing unit 202-1 through 202-m associated with the specific channel. The current interrupt ID register 650B is provided to store the ID (vector) of the interrupt that is being serviced by the processing unit connected to the channel. The current interrupt ID register 650B is valid only when the status field of the control register indicates that an interrupt is being serviced. The current task priority register 650A reflects the priority of the task being executed by the processing unit affiliated with the channel.

Referring back to FIG. 9, the interprocessor interrupt and software interrupt register set 604 provides a set of registers logically accessible at the same locations from all of the CPU channels. The space in this register set provides unique register views to each CPU channel by using the processor ID as an index. Thus, when two processors generate read/write cycles to these registers mapped at the same logic location, they will actually be accessing separate physical registers. The processing units write to these registers to initiate interprocessor interrupts or to schedule software interrupts.

FIG. 10B illustrates the interprocessor interrupt (IPI) register format and its fields. All IPI registers are accessible to the software at either an I/O location or a memory location of the system. The ID of the processing unit is used as an index to determine which register is being accessed. Tables 8 through 11 provide descriptions of the various fields within each IPI register.

TABLE 8

CIG IPI Register Fields

| Field | Name | Bits | Explanation |
|---|---|---|---|
| TT | Trigger Type | 1 | Interrupt is edge triggered or level triggered |
| IP | Interrupt Polarity | 1 | Polarity of the interrupt (active high or low) |
| EN | Enable | 1 | Corresponding interrupt is being used |
| ST | Status | 2 | Current Status of the IPI — refer to Table 9 |
| DTC | Destination Code | 2 | IPI's destination code — refer to Table 10 |
| PL | Priority Level | 4 | Priority Level assigned to the interrupt |

TABLE 8-continued

CIG IPI Register Fields

| Field | Name | Bits | Explanation |
|---|---|---|---|
| DM | Delivery Mode | 3 | Mode of delivering the interrupt — refer to Table 11 |
| DID | Destination ID | 8 | Destination processor ID to which the IPI is scheduled for |
| SID | Source ID | 8 | Originating processor ID |

TABLE 9

IPI Register Status Field Definition

| ST(1:0) | Definition |
|---|---|
| 00 | Idle |
| 01 | Being serviced (dispatched and acknowledged) |
| 10 | Dispatched from the CIC (but not acknowledged) |
| 11 | Queued in the CC |

TABLE 10

IPI Register Destination Code Field Definition

| DTC(1:0) | Definition |
|---|---|
| 00 | Destination ID field (DID) of the IPI register |
| 01 | Self |
| 10 | Broadcast |
| 11 | All processor excluding self |

TABLE 11

IPI Register Delivery Mode Field Definition

| DM(2:0) | Definition |
|---|---|
| 000 | Fixed: Deliver the interrupt to the CPU/CPUs in destination CPU register |
| 001 | Lowest Priority: Deliver the interrupt to the processor executing at lowest priority |
| 010 | TBD |
| 011 | TBD |
| 100 | NMI: Deliver a level triggered interrupt to all CPUs as NMI |
| 101 | Reset: |
| 110 | TBD |
| 111 | TBD |

A processing unit performs a write to its IPI register when it has scheduled an interprocessor interrupt. If a processing unit can schedule multiple interprocessor interrupts, it should monitor the ST (status) field of the IPI register. If this field is idle, then the processing unit can inject an interprocessor interrupt into the system. If a processing unit injects an interprocessor interrupt without checking the status of the IPI register and if the ST field is not idle, then the current interprocessor interrupt and any previously scheduled interprocessor interrupts destiny will be undetermined. It is noted that a software interrupt register for each processor channel may further be provided which has a format identical to that specified for the interprocessor interrupt register. For software interrupts, however, a requested interrupt is delivered only to the interrupt-requesting processing unit.

Figure 11:
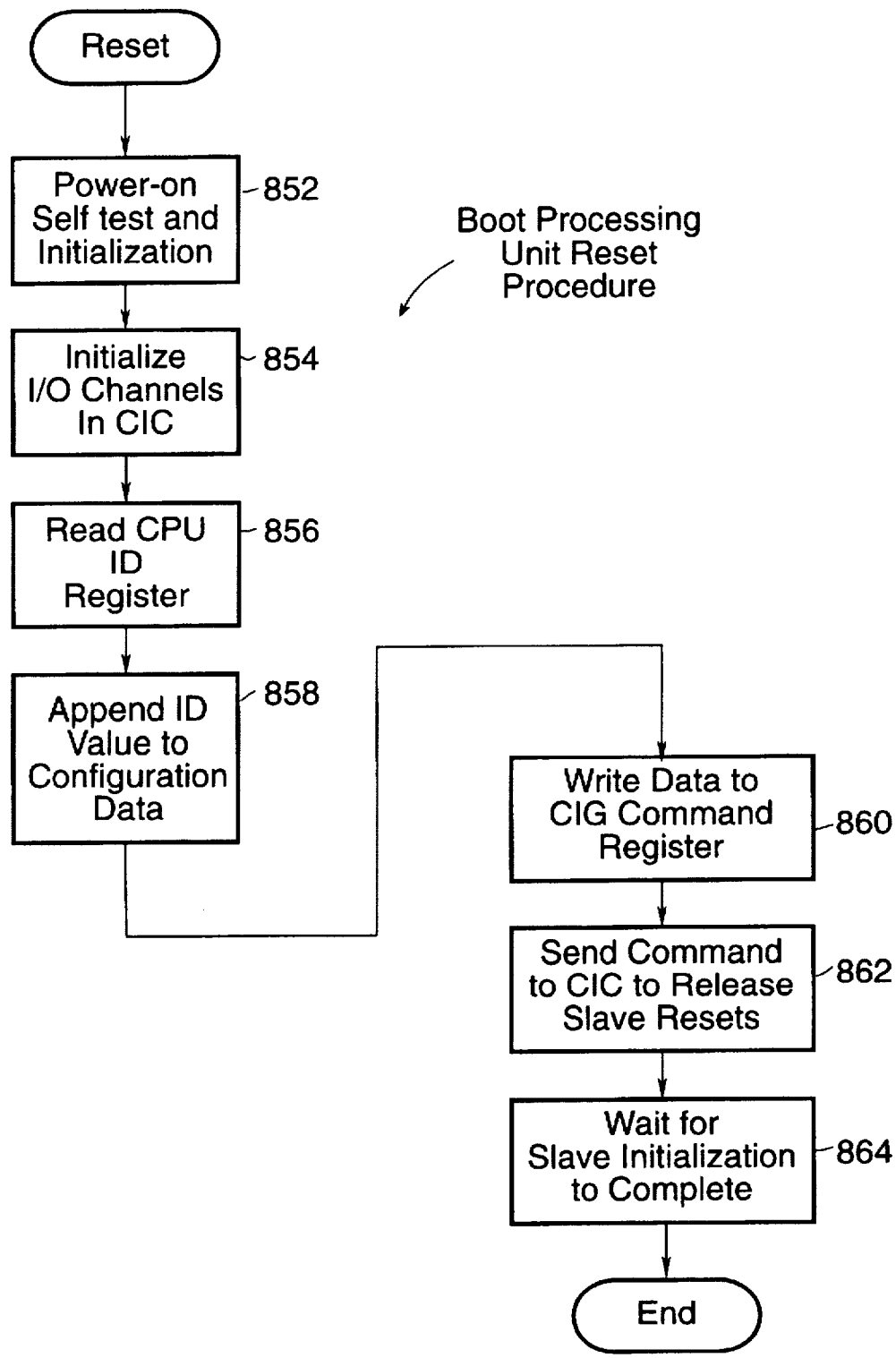
FIG. 11 is a flow diagram which illustrates the operation of the boot processing unit upon system reset.

Referring back to FIG. 2, details regarding the start-up of the computer system 200 as well as the initialization of the various configuration registers within central interrupt control unit 220 are next considered. During system configuration, one of the processing units 202-1 through 202-m is designated as the "boot" processing unit. It is assumed in the below discussion that processing unit 202-1 has been designated as the boot processing unit. FIG. 11 is a flow diagram which illustrates the operation of the boot processing unit upon system reset. During a step 852, the processing unit 202-1 begins a power-on self test procedure and an initialization procedure. It is noted that initially, the other processing units 202-2 through 202-m are held in reset by central control unit 220. During step 854, the processing unit 202-1 initializes the registers unit 504 (i.e., the control register 504A, and the ID (vector) register 504D) of each interrupt channel. As stated previously, the registers unit 504 of each interrupt channel is mapped within the I/O or memory space of the computer system. Each register of each interrupt channel is designated with a predetermined and unique address. The initialization data provided to the registers unit 504 of each interrupt channel is typically stored within the BIOS code of main memory 204. As such, the BIOS code for initializing the registers unit 504 of each interrupt channel is dependent upon the particular system configuration (i.e., the number and type of interrupt-generating resources) and must be provided by the system programmer.

The CPU channel 606-1 of central interrupt control unit 220 that connects to processing unit 202-1 must also be initialized. It is noted, however, that the current task priority register 650A, the current interrupt ID register 650B, the processor ID register 650C, and the control register 650D for a particular CPU channel 606-1 through 606-m reside and are mapped at the same system address locations (either I/O or memory space) as the corresponding registers for the other CPU channels. That is, the address of the current task priority register 650A is identical for each CPU channel 606-1 through 606-m. Similarly, the address of current interrupt ID register 650B for each CPU channel is identical, as are the address values for the processor ID register 650C and the control register 650D of each CPU channel. A processing unit ID value is thus associated with each processing unit 202-1 through 202-m which is embedded within a designated command for initializing or updating the CPU channel registers unit 650 of each CPU channel 606-1 through 606-m. This will be explained in greater detail below.

Figure 12:
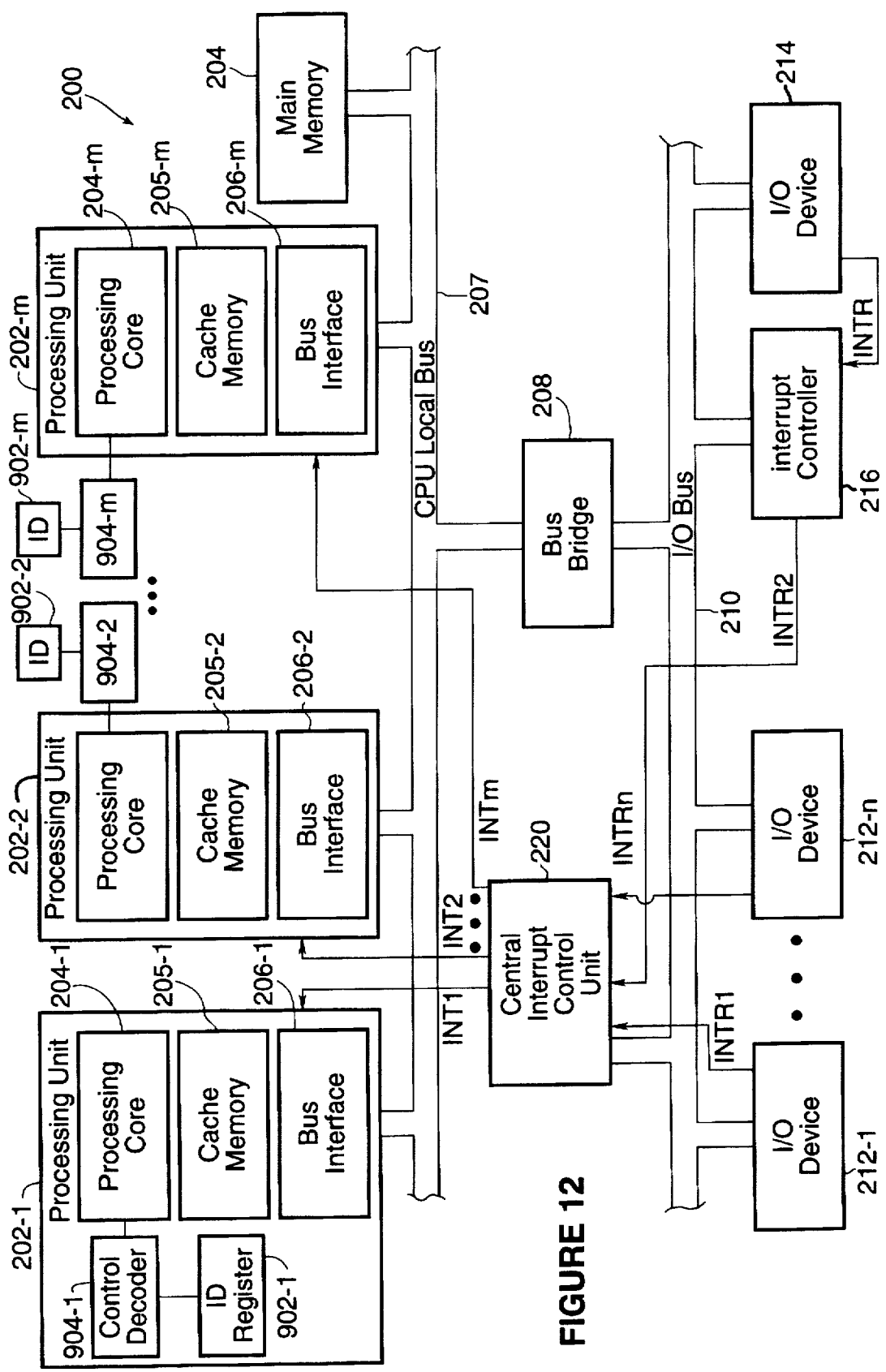
FIG. 12 is a diagram that illustrates hardware which enables the CPU channel registers unit of each CPU channel.

FIG. 12 is a diagram that illustrates in greater detail the hardware which enables the CPU channel registers unit 650 of each CPU channel 606-1 through 606-m to be initialized and updated during normal execution. FIG. 12 illustrates an ID register 902-1 which is associated with processing unit 202-1. Identical ID registers 902-2 through 902-m are also associated with processing units 202-2 through 202-m. Each ID register 202-1 through 202-m contains a value which uniquely identifies the particular processing unit. The ID value of each processing unit may be a hardwired value or may be provided during system configuration. For example, if fifteen processing units are connected within the system, the ID values within ID registers 902-1 through 902-16 may range from 0 to 15, respectively. Each ID register 902-1 through 902-m may be accessed through software command via associated control decoders 904-1 through 904-m of each processing unit. The ID registers may be mapped within either memory or I/O space. It is noted, however, that each processing unit accesses its corresponding ID register 902 via the same address value. For example, the ID register 902 of each processing unit 202-1 through 202-m may be mapped at a memory location of 2000:H. Thus, if a designated processing core 204-1 through 204-m executes a read cycle to the memory location 2000:H, the value residing within the corresponding ID register 902 for that processing unit will be provided to the processing core. Each processing core would read a unique value in these situations.

Figure 13:
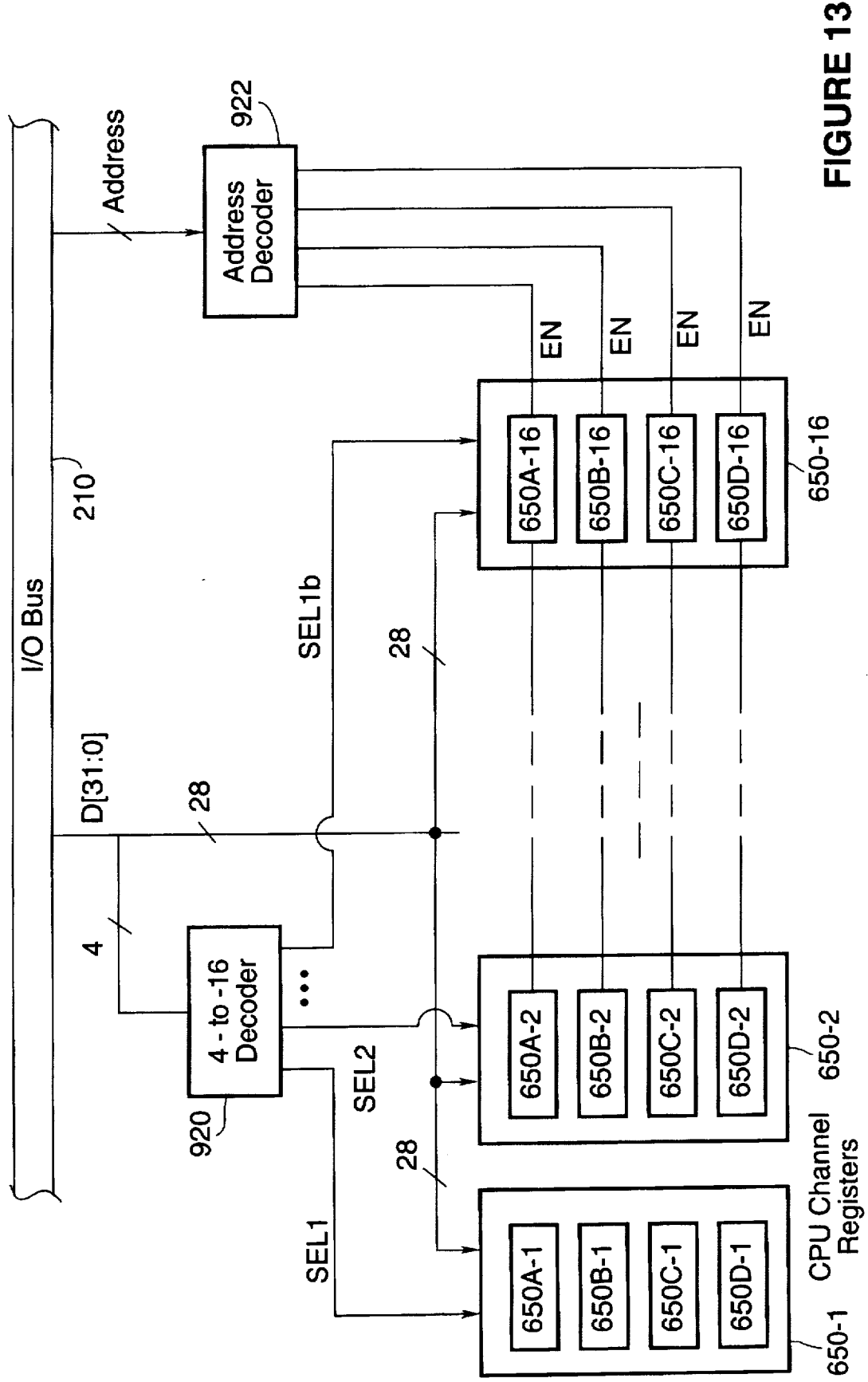
FIG. 13 is a block diagram that illustrates circuitry embodied within the central interrupt control unit.

FIG. 13 illustrates circuitry embodied within the central interrupt control unit 220 that allows data to be written (or read) from the respective CPU channel registers unit 650 of each CPU channel 606-1 through 606-m. In this illustration, it is assumed that a total of sixteen processing units may be connected within the system; however, it is understood that the circuitry may alternatively be configured to accommodate, for example, 256 unique processing units. FIG. 13 illustrates the CPU channel registers units 650-1 through 650-16 for the separate sixteen CPU channels. As stated previously, each CPU channel registers unit 650-1 through 650-16 includes a current task priority register 650A, a current interrupt ID register 650B, a processor ID register 650C, and a control register 650D. Each of these registers is coupled to receive (or provide) data from the data lines of CPU local bus 207. A 4-to-16 decoder circuit 920 is further coupled at its inputs to selected data lines of I/O bus 210. The outputs of the 4-to-16 decoder circuit 920 are coupled to respective select lines of the CPU channel registers units 650-1 through 650-16. It is noted that each CPU channel registers unit 650-1 through 650-16 receives a separate select signal from decoder circuit 920. An address decoder 922 is further coupled at its input to the address lines of I/O bus 210. Four latch enable lines are provided at an output of address decoder 922. An address decoder enable line is coupled to the latching enable inputs of each current task priority register 650A of the CPU channel registers units 650-1 through 650-16, and similarly address decoder enable lines are further connected to each current ID register 650B, each processor ID register 650C, and each control register 650D.

In accordance with the hardware implementation as depicted by FIGS. 12 and 13, when the CPU channel registers unit 650 of a designated CPU channel 606-1 through 606-m must be initialized or updated, the operating system programmer may structure the executing code such that the processor ID value within a designated ID register 902 is embedded as an index to direct attached data to the correct CPU channel registers units 650. For example, consider a situation in which the ID register 902 of each processing unit 202-1 through 202-m is mapped at a memory location 2000:H, and wherein the control register 650D of each CPU channel 606-1 through 606-m is mapped at an I/O address of 3000:H. If the operating system must update the configuration information within control register 650D for a particular processing unit, the programmer may first cause the designated processing unit to execute a memory read cycle to memory location 2000:H to read the value within the particular processing unit's ID register. The programmer may then invoke a command to append the ID value with the configuration data to be stored within the associated control register 650D. Subsequently, an I/O write command to address location 3000:H is executed to write the combined information (i.e., the configuration data along with the processor ID value). This I/O cycle is decoded by address decoder 922 which responsively causes the control registers 650D of each CPU channel registers unit 650-1 through 650-16 to be enabled. The processor ID value which is appended with the configuration data is then decoded by 4-to-16 decoder 920, which provides a select signal to a selected one of the CPU channel registers units 650-1 through 650-16. This causes the configuration data to be stored within only the selected and enabled registers. Configuration data is thereby provided to the designated CPU channel 606-1 through 606-m without requiring separate, dedicated address locations for the configuration registers of each CPU channel. It is noted that cycles for updating the registers of each CPU channel as well as read cycles are accomplished similarly. Exemplary code that carries out the required processor ID read operation as well as the code to append the ID to the configuration data and to write the configuration data to a designated CPU channel is as follows:

```
OS Code to Init a given CPU's control reg
   procedure init_channel
      id:= get mem(2000); — read ID register
      command:= id<< 28 or config data
      put io(3000), command
   end
```

Figure 14:
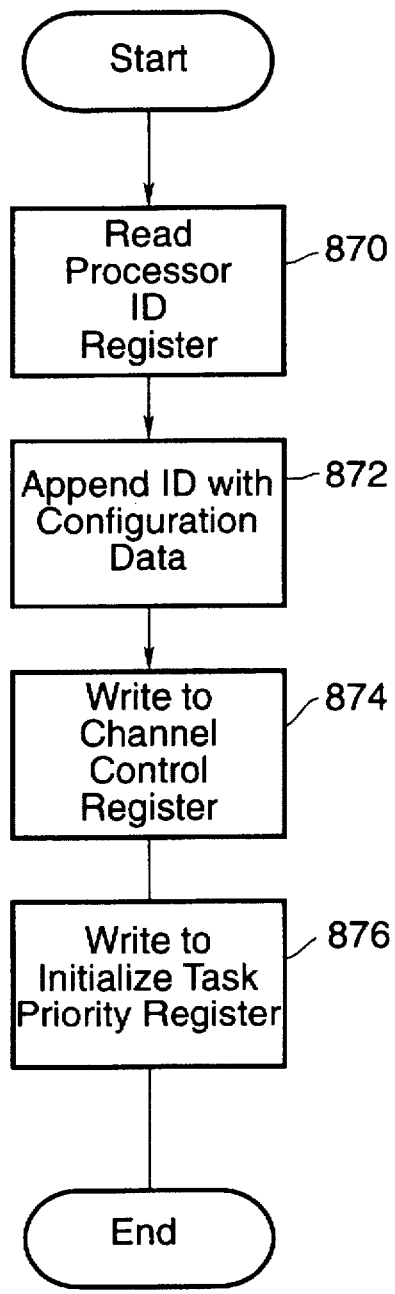
FIG. 14 is a flow diagram that depicts the initialization sequence for each slave processing unit.

Referring back to FIG. 11, after the boot processing unit has initialized the I/O channels in the central interrupt control unit 220 (the configuration registers of each I/O channel are mapped at dedicated locations separately from the configuration registers from the other I/O channels), the boot processing unit 202-1 must initialize the CPU channel 606-1. This is accomplished using the method described above in conjunction with FIGS. 12 and 13. Thus, during step 856, the processing unit 202-1 reads its corresponding ID register 902. During step 858, the processing unit 202 appends its ID register value to the desired configuration data which must be stored within a designated register of CPU channel registers unit 650. The processing unit 202-1 then executes a cycle to write the combined data to the selected register of CPU channel registers unit 650. It is noted that during this cycle, the 4-to-16 decoder 920 of FIG. 13 is employed to select the registers unit 650-1 of the CPU channel 906-1. Similar operations may be initiated to write additional initialization data into other registers of the CPU channel registers unit 650 of CPU channel 606-1. For one implementation, the current task priority register 650A and the control register 650D are written with initialization data by processing unit 202-1 during the initialization sequence. After the processing unit 202-1 has initialized its CPU channel 606-1, the processing unit 202-1 provides a command to the central interrupt control unit 220 which causes the central interrupt control unit 220 to release the remaining processing units 202-2 through 202-m from reset (step 862). Subsequently (step 864), the boot processing unit 202-1 waits for the slave initialization sequence as depicted in FIG. 14 to complete. This completes the initialization sequence.

FIG. 14 is a flow diagram that depicts the initialization sequence of each slave processing unit 202-2 through 202-m. When the master processing unit 202-1 causes the central interrupt control unit 220 to release the remaining processing units from reset, each processing unit 202-2 through 202-m reads its associated ID register 902-2 through 902-m respectively during step 870, appends the ID value with the configuration data to be stored within the control register 650D (step 872), and writes the combined data to the CPU channel registers unit 650 (step 874). The decoder circuit 920 of FIG. 13 is active during these cycles to select the appropriate CPU channel registers unit 650-1 through 650-16 in accordance with the processor ID identified during each particular cycle. Similar operations are repeated to initialize the task priority register 650A of each CPU channel (step 876). It is noted again that since a unique ID value residing within each of the ID registers 902-2 through 902-m is appended to the data written to each register of CPU channel registers unit 650, each processing unit 202-2 through 202-m effectuates its own CPU channel configuration.

Figure 15:
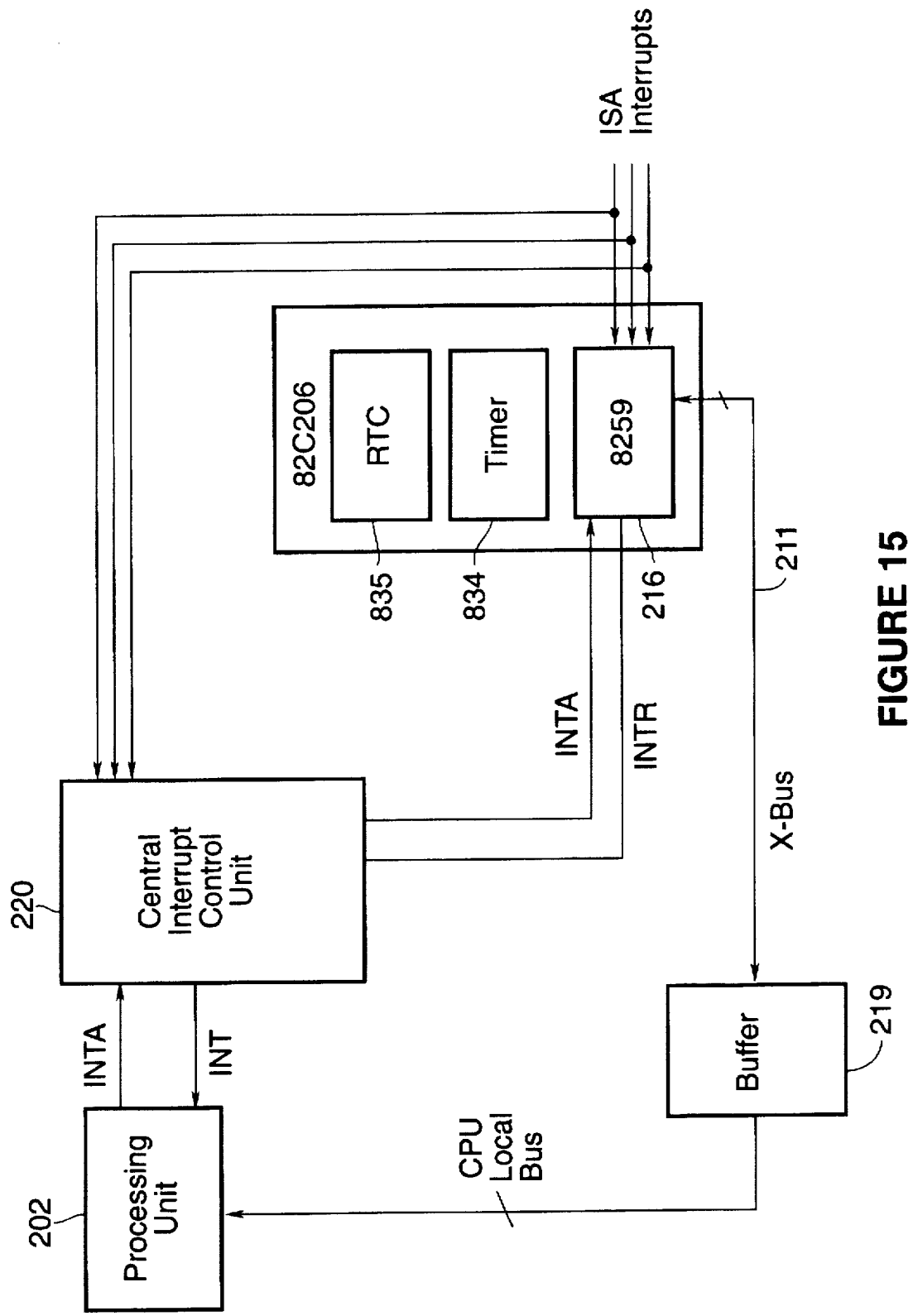
FIG. 15 is a block diagram which illustrates one of the processing units coupled to the central interrupt control unit.

Referring back again to FIGS. 2 and 4, it was stated previously that each designated interrupt channel 402-1 through 402-n may be programmed in what is referred to as the "8259" mode. This allows a programmable interrupt controller such as interrupt controller 216 to be connected to central interrupt control unit 220 when a particular interrupt channel is programmed in the 8259 mode (as indicated by the CM field of the associated control register 504A). During the 8259 mode of operation, the interrupt signal from the 8259 interrupt controller is passed through the central interrupt control unit 220 in accordance with its programmed priority, and the acknowledge signal from the receiving processing unit 202-1 through 202-m is passed back through the central interrupt control unit 220 to the interrupt controller 216. This is depicted within FIG. 15 which shows one of the processing units 202 coupled to the central interrupt control unit 220 and to a buffer 219. When an ISA interrupt is received at an interrupt input of the 8259 interrupt controller 216, the interrupts are passed through the central interrupt control unit 220 and, in accordance with the programmed priority level and other central control routing, is passed to a designated processing unit 202. When the designated processing unit 202 acknowledges the cycle, the interrupt acknowledge signal INTA is passed through the central interrupt control unit 220 and is received at the interrupt acknowledge line of the 8259 interrupt controller 216. The interrupt controller 216 responsively drives the interrupt vector on an X-bus 211 (or any other bus), and the interrupt vector is passed to the processing unit 202 via a buffer 219. It is noted that buffer 219 may be embedded within bus bridge 208. Accordingly, for the 8259 cascade mode, the central interrupt control unit 220 does not directly respond to the interrupt acknowledge cycle of the receiving processing unit 202, and instead allows the vector information to be provided from the 8259 interrupt controller 216. It is further noted that accommodation of the 8259 cascading mode as described above advantageously allows the use of integrated interrupt sources such as a model 82C206 integrated circuit which includes a system timer 834 and a real time clock 835.

Figure 16:
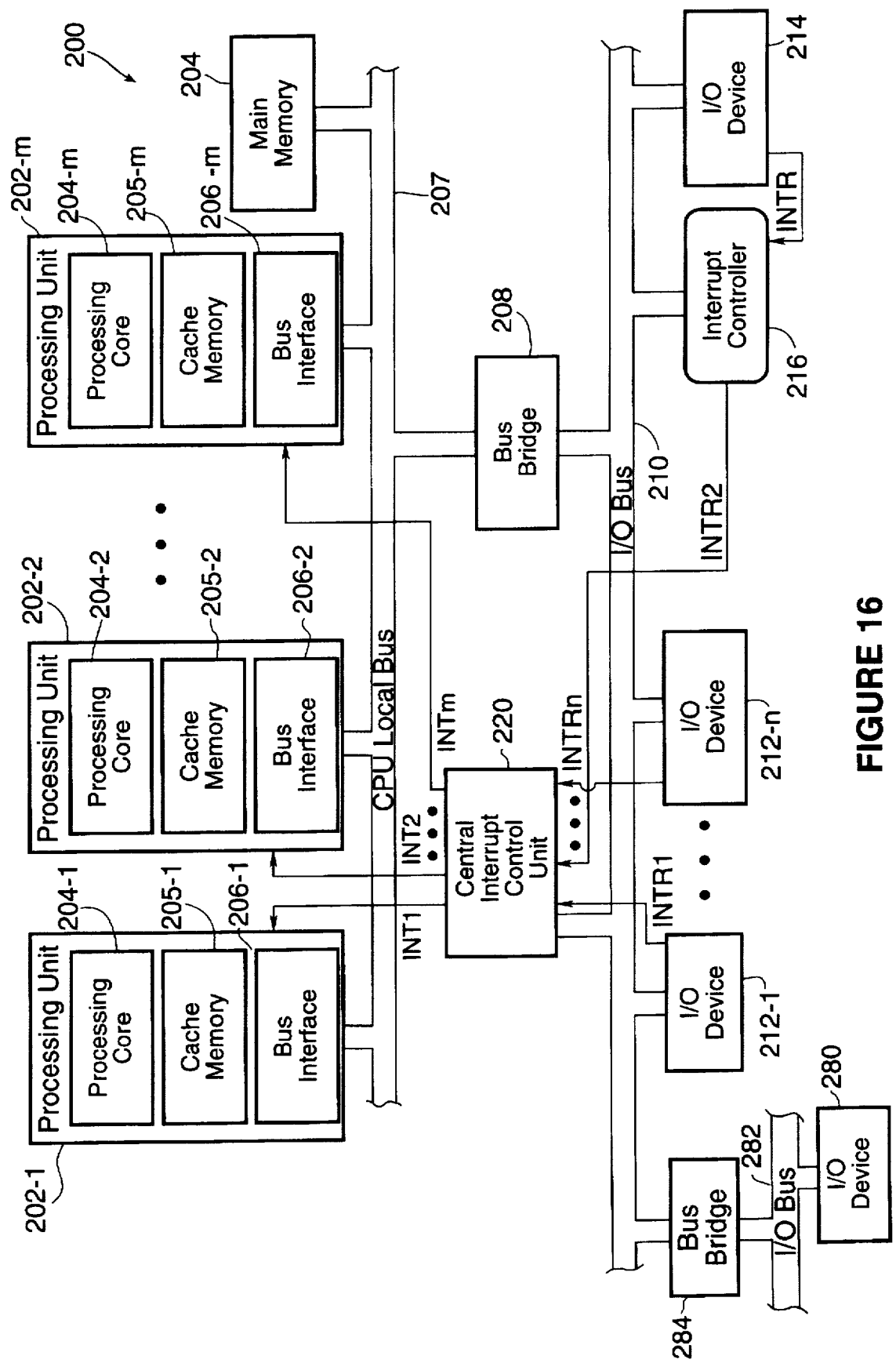
FIG. 16 is a block diagram of a multiprocessing system which accommodates specially defined interrupt cycles for initiating an interrupt.
Figure 17:
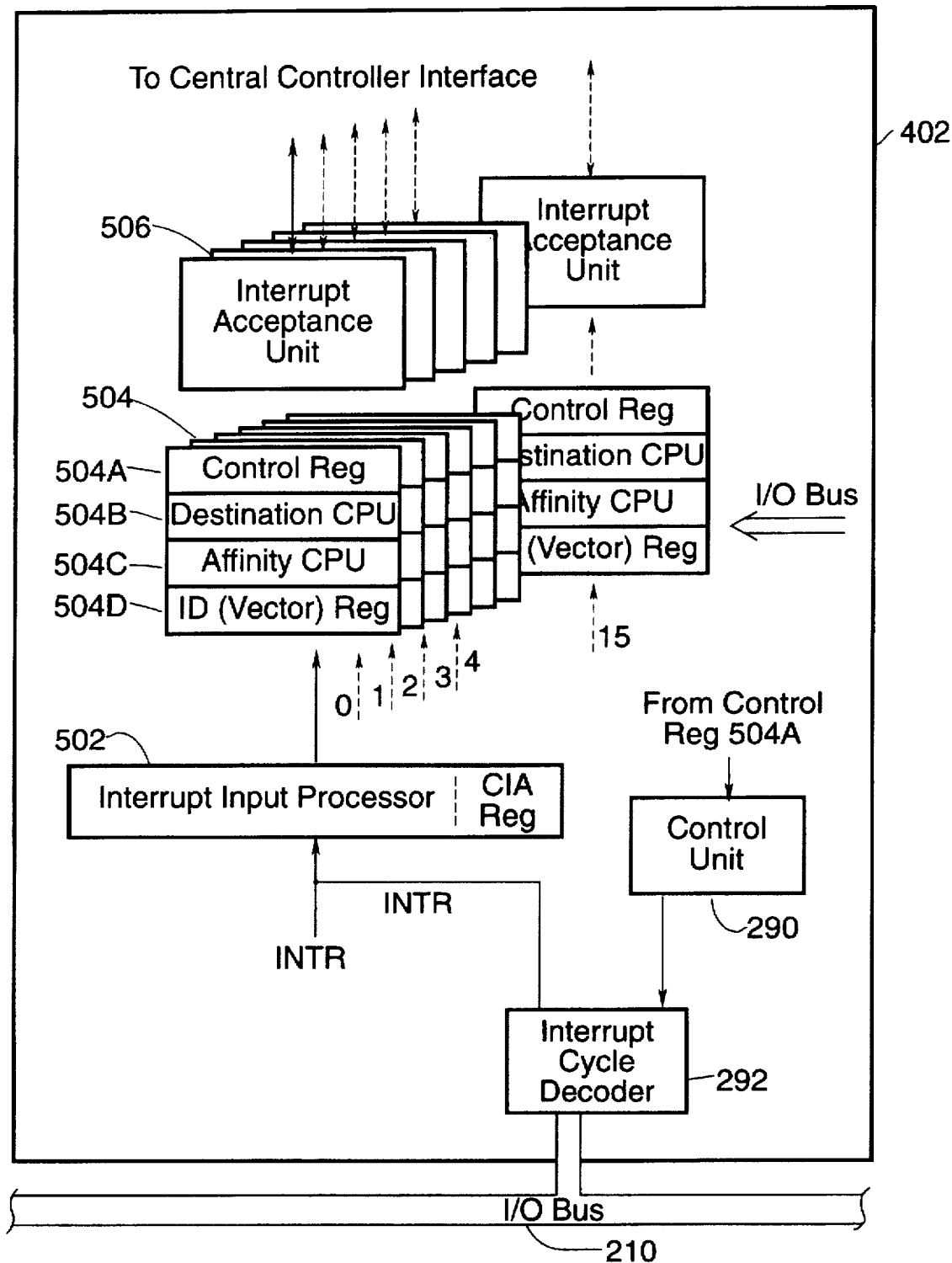
FIG. 17 is a block diagram that illustrates an interrupt channel including hardware configured to decode an interrupt cycle.

Referring back to FIG. 2, the multiprocessing system 200 may further be configured to allow the transfer of interrupt information across various interfaces using a specially defined cycle which is transferred across one or more of the buses incorporated within the system. This will be best understood with reference to FIG. 16. FIG. 16 is a block diagram of the multiprocessing system as generally represented in FIG. 2 with an additional I/O device 280 coupled to a second I/O bus 282. The second I/O bus 282 is coupled to I/O bus 210 via a bus bridge 284. The bus bridge 284 is illustrative of, for example, a docking station for coupling a portable computer as represented by I/O device 280 to the multiprocessing system. For the system of FIG. 16, the I/O device 280 may provide an interrupt signal to bus bridge 284. However, due to the cost and the possible unavailability of dedicated interrupt pins that coupled bus bridge 284 to central interrupt control unit 220, bus bridge 284 may not be configured to assert an interrupt signal at a dedicated line that is received by central interrupt control unit 220. Instead, in response to the assertion of an interrupt by I/O device 280, the bus bridge 284 may effectuate a specialized cycle, or a memory or I/O cycle to a dedicated memory location, to which a particular interrupt channel of central interrupt control unit 220 will respond. FIG. 17 illustrates an interrupt channel including hardware configured to decode an interrupt cycle as executed by bus bridge 284 and to assert a corresponding interrupt signal within the corresponding interrupt channel. As illustrated in FIG. 17, a control unit 290 is responsive to the CM field of control register 504A and correspondingly enables the interrupt cycle decoder 292 if the interrupt channel mode is designated as an I/O bus mode. When control unit 290 enables interrupt cycle decoder 292, the specialized interrupt cycle generated by bus bridge 284 is detected by interrupt cycle decoder 292, which correspondingly asserts an interrupt signal at the INTR input of interrupt input processor 502. It is noted that for situations in which I/O bus 210 is a PCI standard configuration bus, the special interrupt cycle may be defined by pre-specified coding of the cycle definition bits of the PCI bus. Alternatively, the special interrupt cycle may be defined as a cycle to a predetermined address in either the memory or I/O space of the system.

Figure 18:
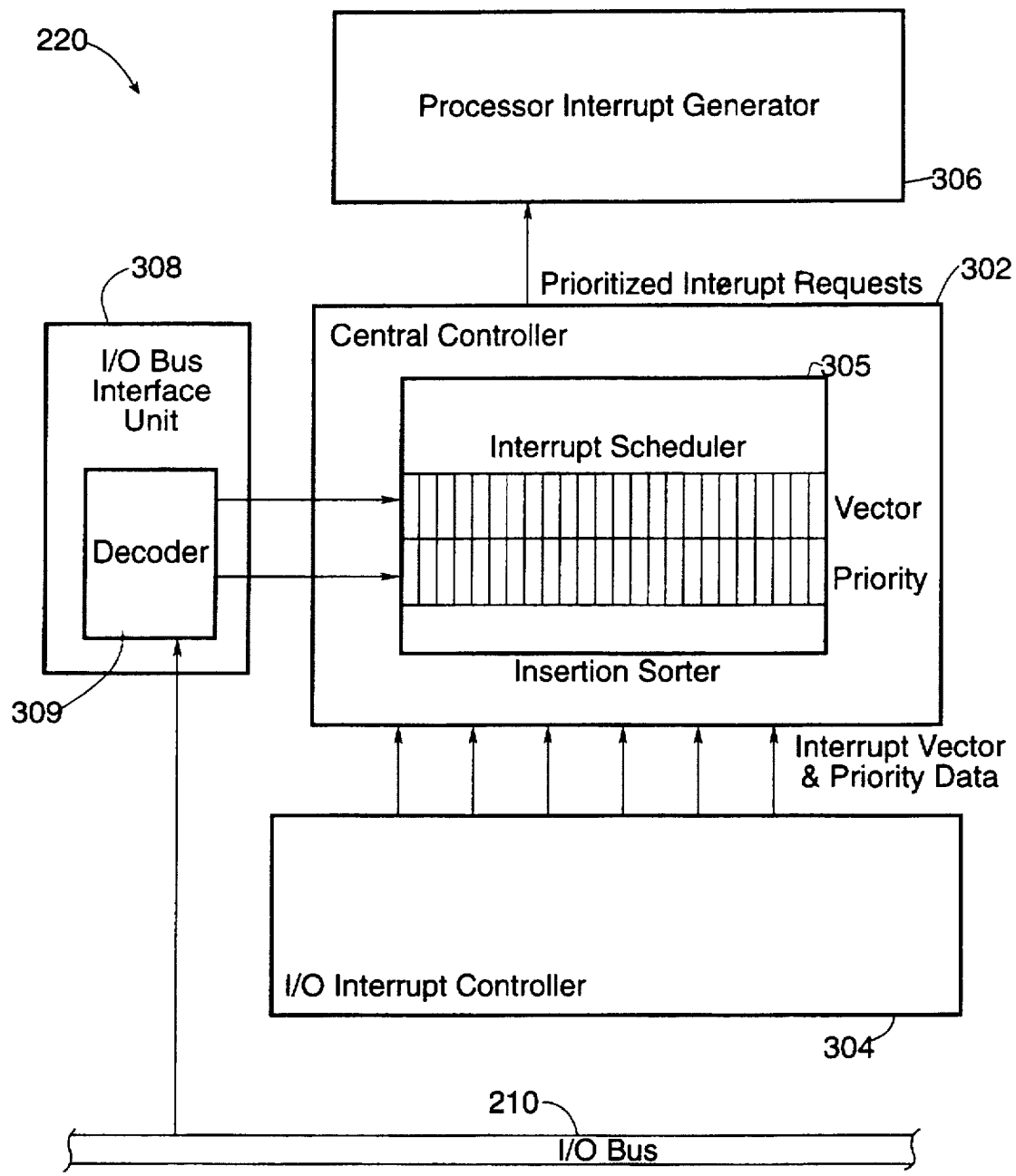
FIG. 18 is a block diagram that illustrates a portion of the central interrupt control unit including an internal portion of the central controller.

The prioritization of interrupts by central controller 302 is next considered. FIG. 18 is a block diagram that depicts a portion of central interrupt control unit 220 including I/O interrupt controller 304, central controller 302, and processor interrupt generator 306. Rather than automatically associating a particular interrupt with a fixed priority depending upon its interrupt vector, the central interrupt control unit 220 allows each interrupt to have a separate programmable interrupt vector and a separate priority. The priority is stored within the PL field of the associated control register 504A for the interrupt channel. As stated previously, upon system initialization, the vector for each interrupt channel is set. In addition, the priority level for the interrupt channel is also set. Once a particular interrupt request is accepted by the I/O interrupt controller 304, the interrupt vector and priority data is processed by an interrupt scheduler 305 of the central controller 302 which correspondingly provides the interrupt vector and priority data for each interrupt within a pending interrupt queue 652 (FIG. 10) of a designated CPU channel of the processor interrupt generator 306. The interrupts are provided to the various interrupt queues of the CPU channels in a prioritized manner based upon the priority level indicated by the interrupts control register as well as based upon the current task priorities of the available processing units. FIG. 18 illustrates a decoder unit 309 within the I/O bus interface unit 308 which allows separate programming of the vector information and priority information for each interrupt via designated I/O or memory cycles on I/O bus 210. For one simple configuration, the pending interrupt requests are provided to the interrupt queues of the CPU channels in their prioritized order.

Figure 19:
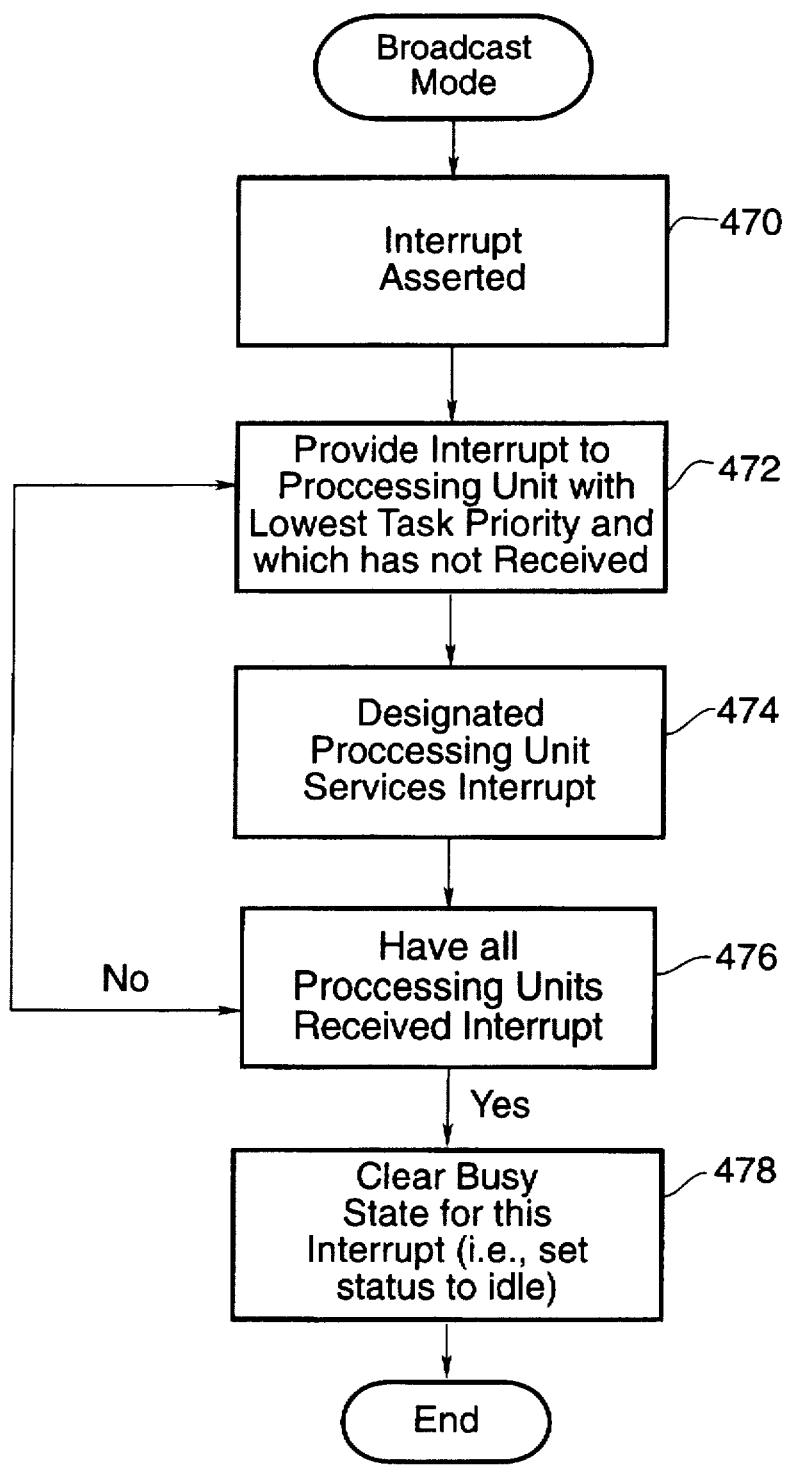
FIG. 19 is a flow diagram that illustrates the delivery of an interrupt during the broadcast mode.

Referring again to FIG. 2, it was stated previously that selected interrupts such as a timer tick interrupt may need to be provided in a broadcast fashion to each processing unit 202-1 through 202-m. If the delivery mode for a particular interrupt signal is designated as broadcast mode (i.e., DM field of the control register 504A for the interrupt), the central controller 302 operates in accordance with an autochaining technique as depicted in the flow diagram of FIG. 19. As illustrated in FIG. 19, if the interrupt request signal for an interrupt designated as broadcast is asserted as determined during step 470, the interrupt is provided to the processing unit 202-1 through 202-m that has the lowest current task priority level (as indicated by the current task priority register 650A for that CPU channel) during step 472. During step 474, the designated processing unit services the interrupt and returns an End Of Interrupt (EOI) command to the central controller 302. If all processing units 202-1 through 202-m have not yet received the interrupt (step 476), the interrupt is provided to the next processing unit 202-1 through 202-m which has not yet received this interrupt and which has the lowest current task priority value (of those remaining processing units that have not yet received the interrupt). This next processing unit then services the interrupt and returns an End Of Interrupt command to the central controller 302. This process repeats until each processing unit 202-1 through 202-m has serviced the interrupt. When all processing units have received and serviced the interrupt, the busy bit for the interrupt (i.e., the idle state of the ST field of the control register 504A for the interrupt channel) is cleared (step 478). It is understood that a similar auto-chaining procedure may be carried out if a designated set of processing units must receive a particular interrupt, rather than all the processing units. In accordance with the auto-chaining technique described above in which interrupts such as timer tick interrupts are provided to two or more of the processing units, the central controller 302 intelligently selectively passes the interrupt to the processing unit having the lowest current task priority level indicated. The interrupt is not passed to subsequent processing units until the prior processing unit has completed its service of the interrupt. As a result, bus contention is minimized and system performance is maximized by interrupting the processing units with the lowest relative current task priority values before interrupting processing units with high relative task priorities.

The central interrupt control unit 220 is further configured to prevent the occurrence of spurious interrupts. As stated previously, when a level triggered interrupt is being serviced by a designated processing unit, an I/O command is typically associated with the interrupt service routine that, when executed, causes the interrupt source to deassert the interrupt signal. Subsequently, an End Of Interrupt (EOI) command is executed to inform the central interrupt control unit 220 that the interrupt service has completed. A spurious interrupt may occur if a significant latency is introduced between the time at which the processing unit executes the I/O command (to cause the interrupt source to deassert the interrupt signal) and the time at which the interrupt signal is deasserted. Such a latency may occur, for example, if the I/O device resides on a remote bus via several bus interface units. If the interrupt source does not deassert the interrupt signal before the centralized interrupt controller responds to the End Of Interrupt command, the continued assertion of the interrupt may be detected by the central interrupt control unit 220, thus, causing the interrupt to be unintentionally re-initiated.

Figure 20:
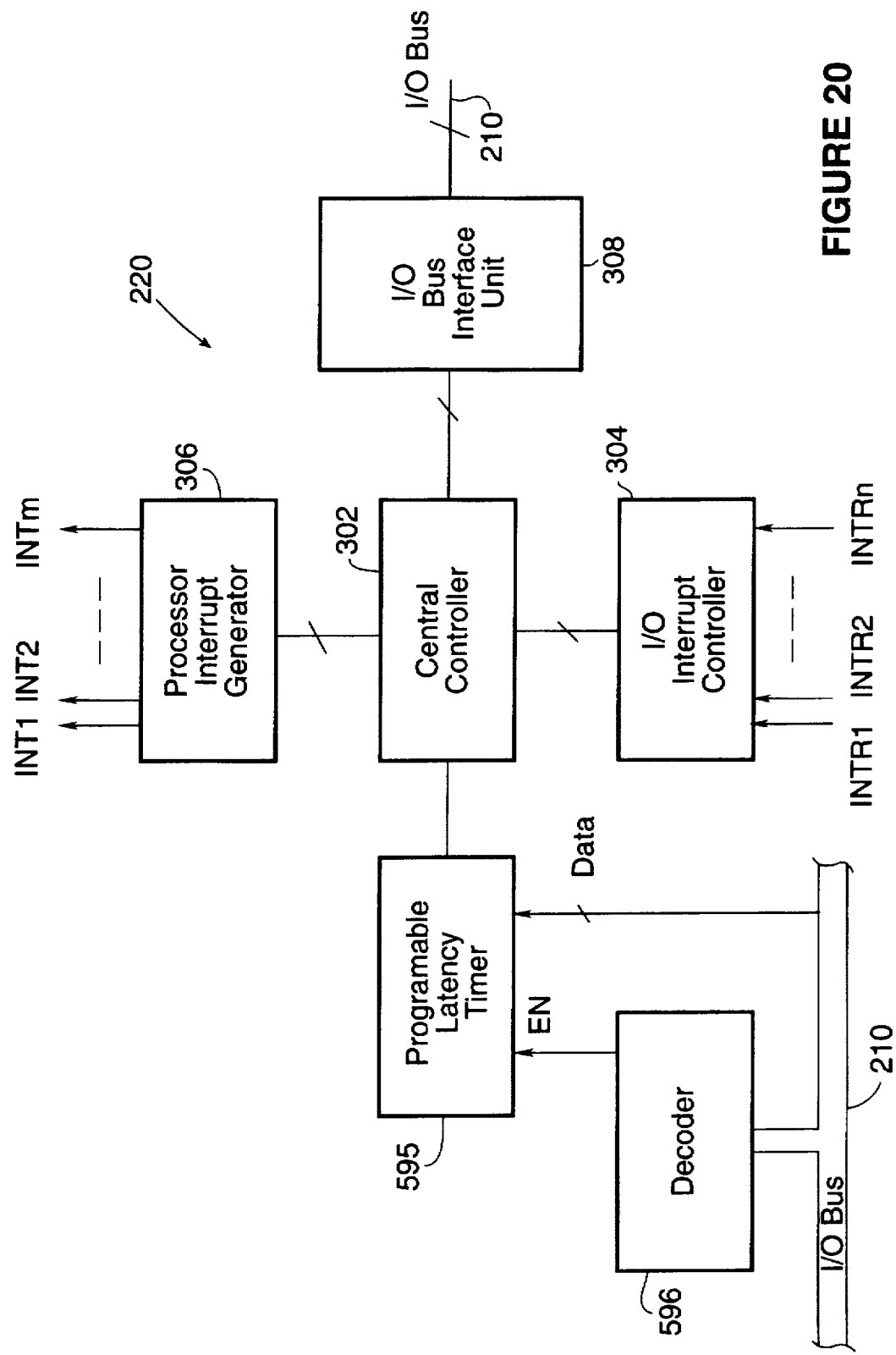
FIG. 20 is a block diagram of the central control unit including a programmable latency timer.

Referring to FIG. 20, the central control unit 220 is advantageously associated with a programmable latency timer 595 coupled to I/O bus 210 through a decoder unit 596. The programmable latency timer 595 may be programmed by a system user to set a programmable time delay between the time at which the central controller 302 receives an End Of Interrupt command and the time at which the central controller 302 resets the status (ST) field of the control register 504A of the particular interrupt channel. It will be appreciated that the I/O interrupt controller 304 is configured such that a designated interrupt signal is not monitored if the status indicates that the interrupt is either being serviced, has been dispatched from the central interface control unit 220 to a particular processing unit, or has been queued in the central controller 302. Once the central controller 302 resets the status to idle for a particular interrupt signal, the I/O interrupt controller 304 continues to monitor the particular interrupt signal for subsequent assertions. It is noted that since programmable timer 595 delays the resetting of the ST field of the control register for the particular interrupt channel, spurious interrupts may be prevented. It is further noted that the programmable timer 595 may be selectively enabled for each interrupt via the EOI field of that interrupt's channel control register 504A. It is also noted that decoder 596 may be embodied as an integral part of I/O bus interface unit 308.

Figure 21:
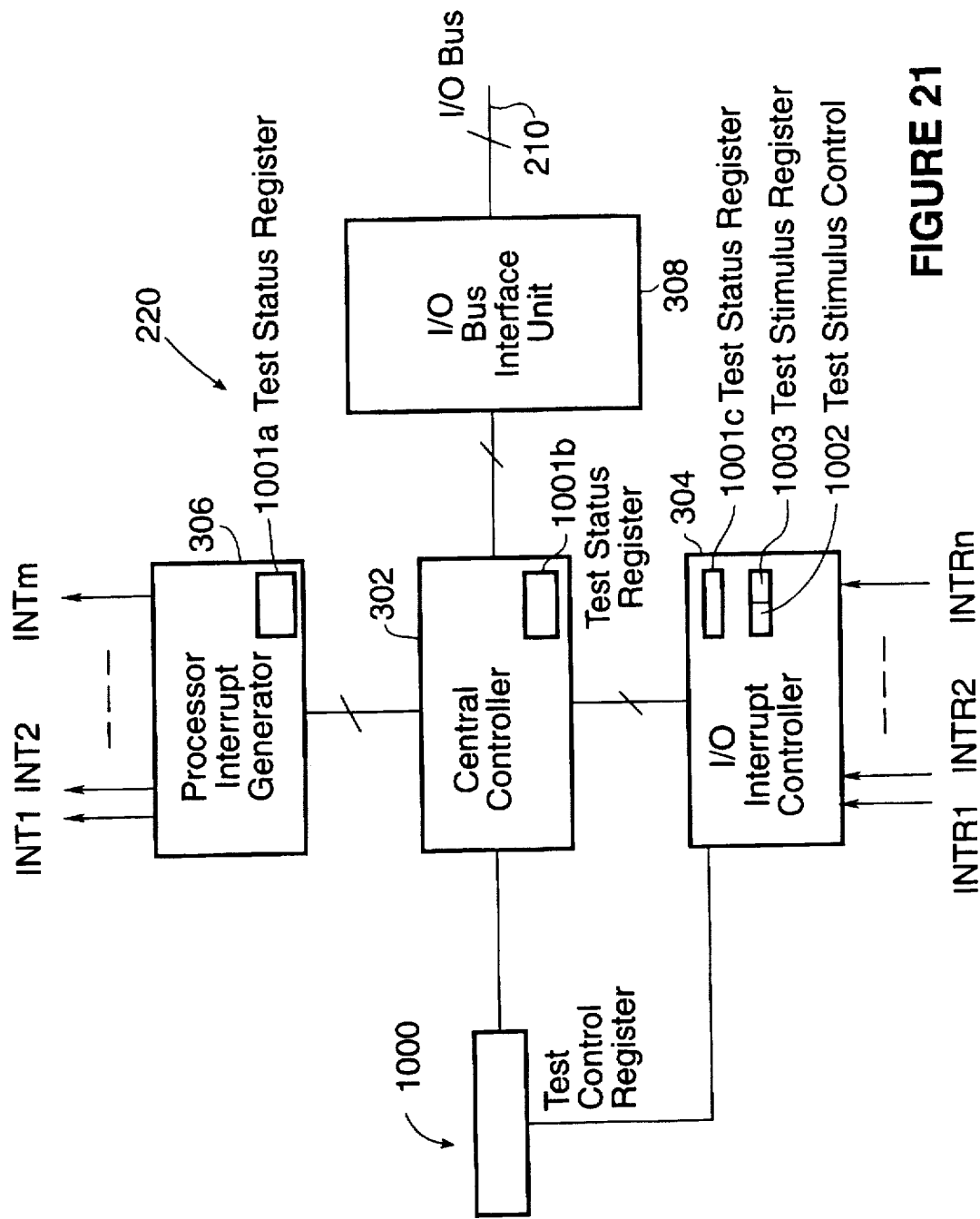
FIG. 21 is a block diagram of a central interrupt control unit having a test registers in accordance with one embodiment of the present invention.

Referring now to FIG. 21, there is shown a block diagram of the central interrupt control unit of FIG. 3, employing a test mechanism in accordance with the present invention. For convenience, components that correspond to those shown in FIG. 3 employ the same reference numerals. One or more test control registers 1000 are coupled to central controller 302 and I/O interrupt controller 304. Test control register or registers 1000 are used to initiate the sequence of test interrupt routines. One or more test stimulus registers 1003 are located within I/O interrupt controller 304. The test stimulus register 1003 is used to generate the actual test interrupts required by test control register 1000. Finally, one or more test status registers 1001a, 1001b, and 1001c, are coupled within processor interrupt generator 306, central controller 302, and I/O interrupt controller 304, respectively. The test status registers 1001a through 1001c are used to store the current state of a given interrupt test.

The functionality of the test registers may be understood using the example of a single interrupt directed to a particular processor. Upon initiation of testing, the test control register will, responsive to a command received from a control processor or processors, cause the appropriate test interrupt routine to be initiated. Test stimulus circuitry associated with the test stimulus register will assert the appropriate interrupt line of the interrupt input processor, which will process the interrupt as previously described. It will be recalled that, upon reset, registers in the interrupt channels will have been set with the appropriate destination and delivery mode for the particular interrupt. Prior to delivering the interrupt to the central controller, a status register or registers may be written to (for later reading) so as to ensure that the interrupt input processor and/or interrupt acceptance unit have properly routed the interrupt in the proper mode including, for example, appropriately routing according to the proper cascade mode, delivery mode, destination, interrupt identification, and CPU affinity.

Assuming that the interrupt successfully propagates through the interrupt interface channel, it will be routed through the central controller. The central controller, as discussed above, is responsible for, among other things, maintaining the current task priorities of the processing units and is capable of identifying and routing interrupts that need to be routed in a broadcast fashion. In the current example, task priority should not matter, since the interrupt has been identified as being routed to a specific processor. Once the interrupt successfully propagates through the central controller, it is delivered to the processor channel interface.

Since the interrupt has had its destination processor predetermined according to a control register, it will be sent to the processor channel corresponding to that processor. There, it will be queued in the interrupt queue with the other interrupts destined for that processor. As discussed above, the interrupt's location in the queue depends upon its priority relative to the other interrupts. Again, test status registers may be provided which may be used to determine whether the interrupt had been properly assigned to the queue. It should be noted that while only one each of test control, test status, and test stimulus registers are shown in FIG. 3, the number and location of test control, status and stimulus registers is exemplary only. Further, other types of memory units, such as random access memory, may be employed.

Upon the assertion of the interrupt at the processor and the completion thereafter of the interrupt process, the status registers will be read. If the status registers provide a reading inconsistent with the intended progress of the interrupt, the tester will know the stage at which the test failed. Once the first test interrupt has been tested successfully, each succeeding interrupt may be tested as set forth above. Thus, the tester will be able to incrementally test the interrupt controller. A more detailed description of the test register mechanism follows.

As discussed above, test control register 1000 provides for initiating a test interrupt sequence. Test control register 1000 may be a 32-bit register, or a series of 32-bit registers. Test control register 1000 has a bit associated with each interrupt to each CPU 202-1 through 202-m. When the bit is set, the particular interrupt will be initiated. Alternatively, test control register 1000 may be configured such that a particular bit controls a sequence of interrupts. For example, setting a particular bit in the test control register might initiate a test sequence including an interprocessor interrupt followed by a first nonmaskable interrupt to a first processor, followed by a second, maskable interrupt to another processor.

Figure 22:
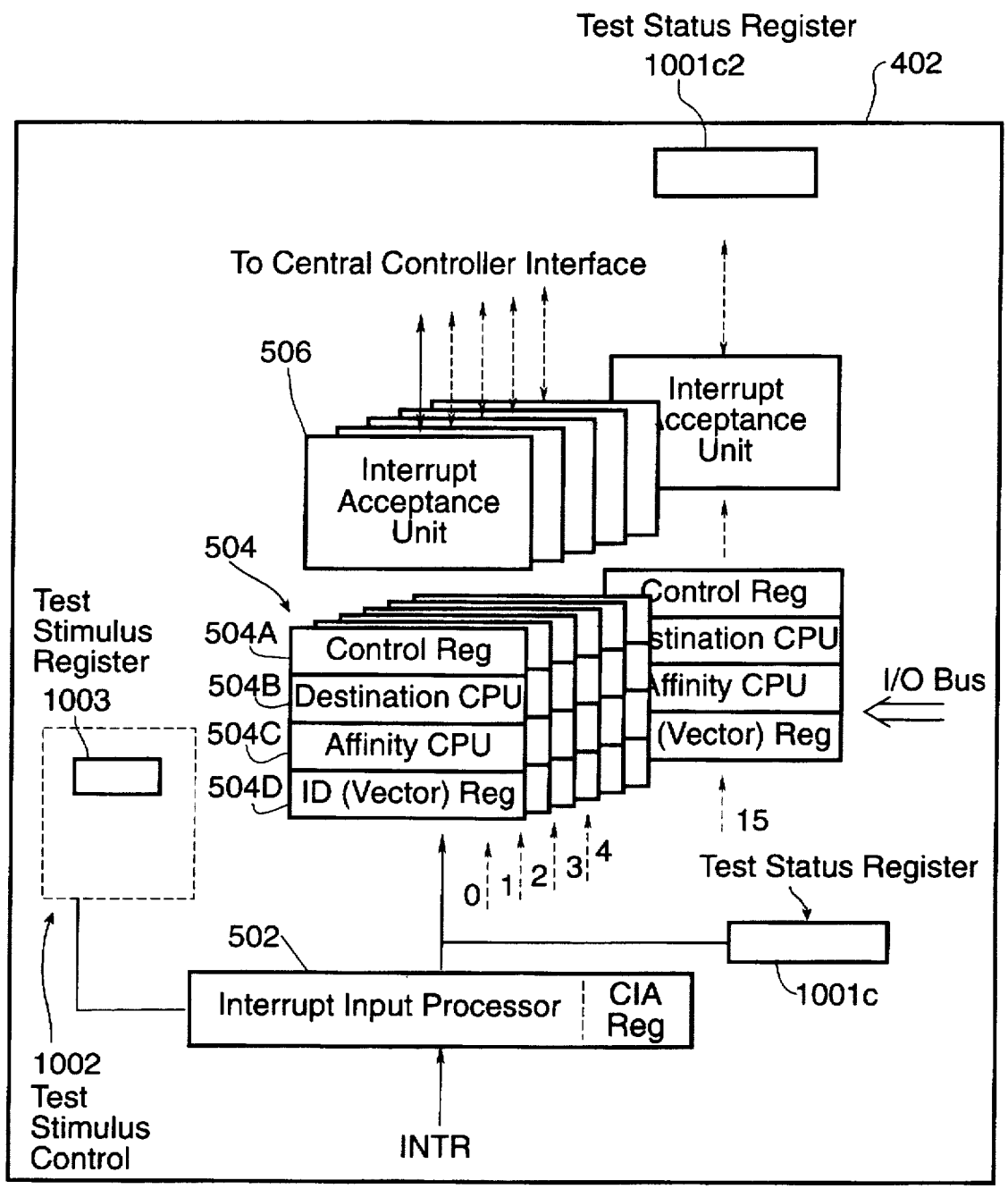
FIG. 22 is a block diagram of an interrupt channel having dedicated test registers according to one embodiment of the present invention.

Turning now to FIG. 22, there is shown a block diagram illustrative of an interrupt channel 402 that includes a test stimulus register or registers 1003 responsive to an interrupt test mode and the test sequence initiated by test control register 1000. The interrupt channel of FIG. 22 is similar to that shown in FIG. 5; the same reference numerals are employed for common components. Test stimulus register or registers 1003 are coupled within a test stimulus controller 1002, which in turn is coupled to the inputs of interrupt input processor 502. Test stimulus register or registers 1003 and test stimulus controller 1002 provide the test stimulus that is initiated by test control register 1000. The test stimulus registers 1003 and test stimulus controller 1002 may be configured to generate either edge-triggered or level-triggered interrupts. In this way, an external test stimulus is not required.

Interrupt input channel 402 may also include test status registers 1001c1 and 1001c2. Test status register 1001c1 may be located at the outputs of or within interrupt input processor 502. Test status register 1001c1 may be used to determine whether the test stimulus provided by the test stimulus register and stimulus controller have successfully propagated through interrupt input processor 502. Similarly, test status register 1001c2 may be positioned within the central controller interface of the interrupt input channel 402. Test status register 1001c2 may be used to read whether a particular interrupt has had associated with it the appropriate processor affinity, vector, etc.

Figure 23:
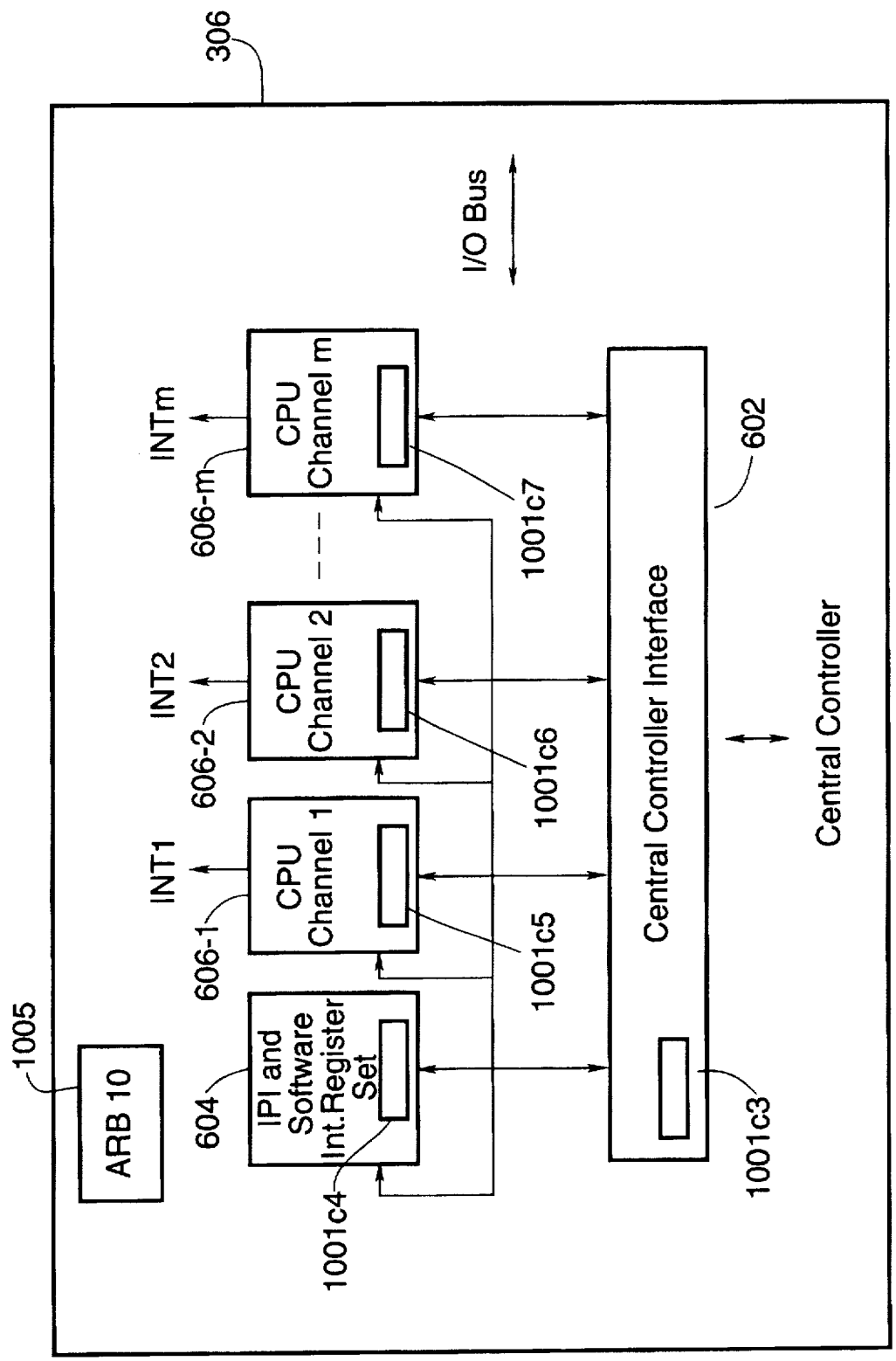
FIG. 23 is a block diagram of a processor interrupt generator employing test registers according to one embodiment of the present invention.

Turning now to FIG. 23, a processor interrupt generator 306 employing test registers in accordance with the present invention is shown. FIG. 23 is similar to FIG. 9. For convenience, common components employ the same reference numerals. Coupled within each of the CPU channels 606-1 through 606-m, as well as IPI interrupt channel 604, is a test status register 1001c4 through 1001c7. As will be discussed in more detail below with respect to FIG. 24, these test status registers can be used, for example, to determine whether the appropriate interrupt has been dispatched to the processors. Processor interrupt generator 306 further includes an arbitration identification mechanism or register 1005. Arbitration identification register 1005 may be used to read which processor is presently accessing the interrupt controller. In this fashion, the test mechanism in accordance with the present invention can determine whether or not the controller has succeeded in dispatching the interrupt.

Figure 24:
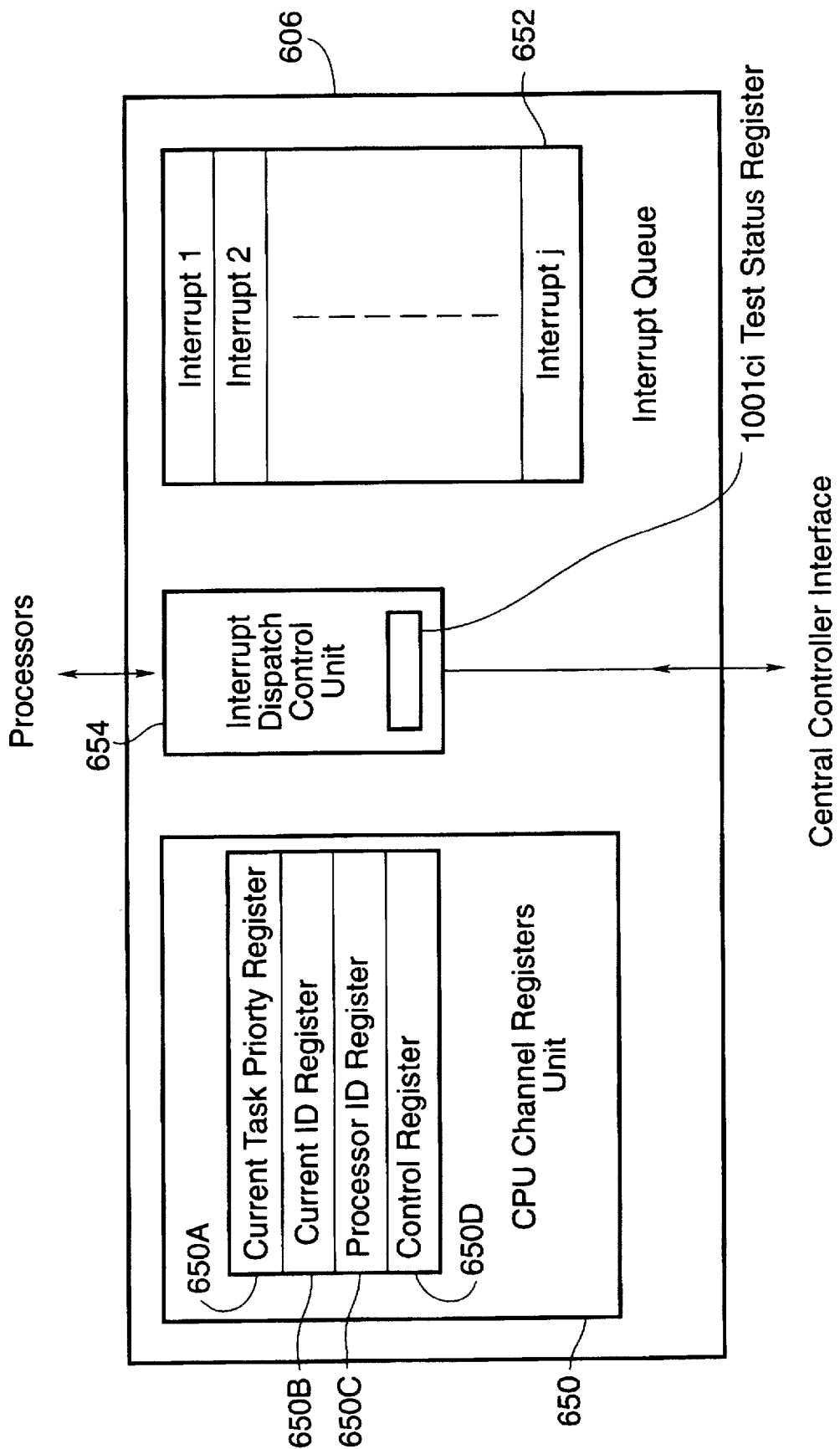
FIG. 24 is a block diagram of a CPU channel employing test registers according to one embodiment of the present invention.

Turning now to FIG. 24, there is shown in more detail a CPU channel 606 employing an exemplary test status register 1001ci. FIG. 24 corresponds generally to FIG. 10; common components are identified with the same reference numerals. Test status register 1001ci may be located, for example, in interrupt dispatch control unit 654. Test status register 1001ci may be read at any time to determine whether the appropriate interrupt has been queued in interrupt queue 652 for dispatch, for example.

Figure 25:
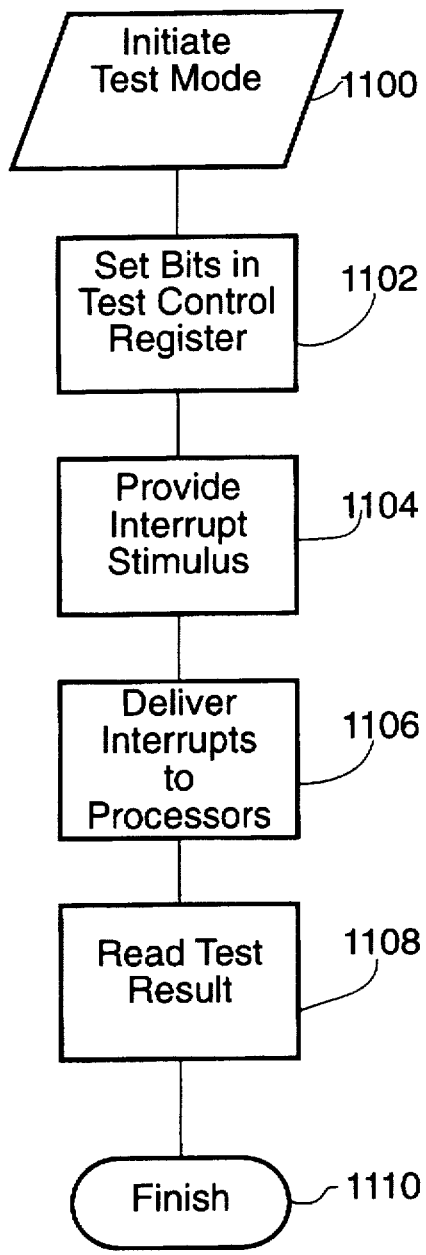
FIG. 25 is a flow chart showing the test process according to one embodiment of the present invention.

Turning now to FIG. 25, there is illustrated a flow chart showing generalized operation of the test registers in the test mode described above. A test mode is initiated in step 1100. In response to entry into test mode, the appropriate interrupt bits of test control register 1000 are set in step 1102. It will be recalled that test control register 1000 may be configured to provide either edge- or level-triggered interrupts. Responsive to the appropriate interrupts set in test control register 1102, the test stimulus register(s) 1003 provide the appropriate interrupt stimulus to the CPUs (step 1104). The interrupts are then delivered to the appropriate CPU (step 1106). The result of the testing are then read (step 1108), and test mode is exited (step 1110).

Figure 26A:
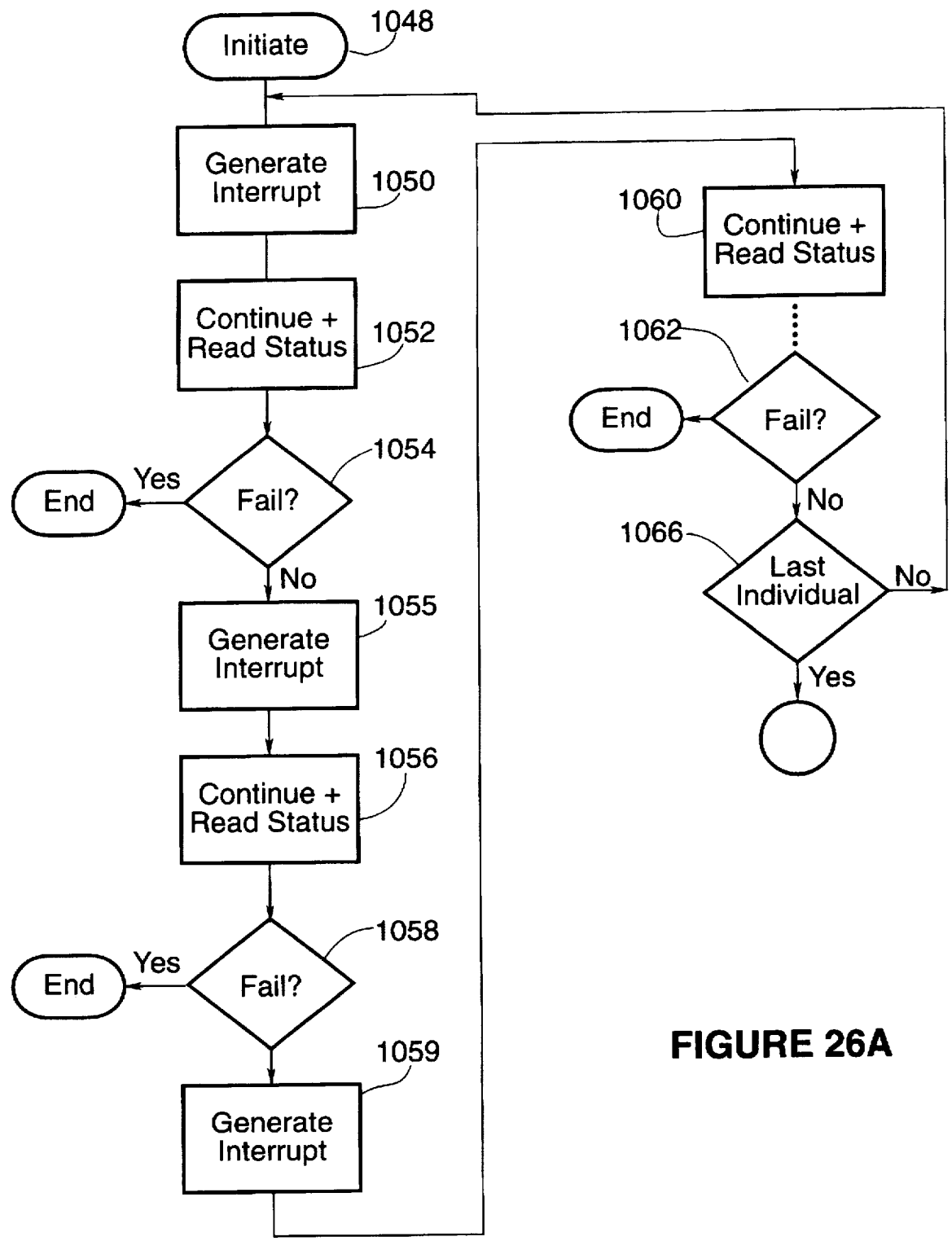
FIG. 26a and FIG. 26b illustrate a flow chart showing the test process according to one embodiment of the present invention.
Figure 26B:
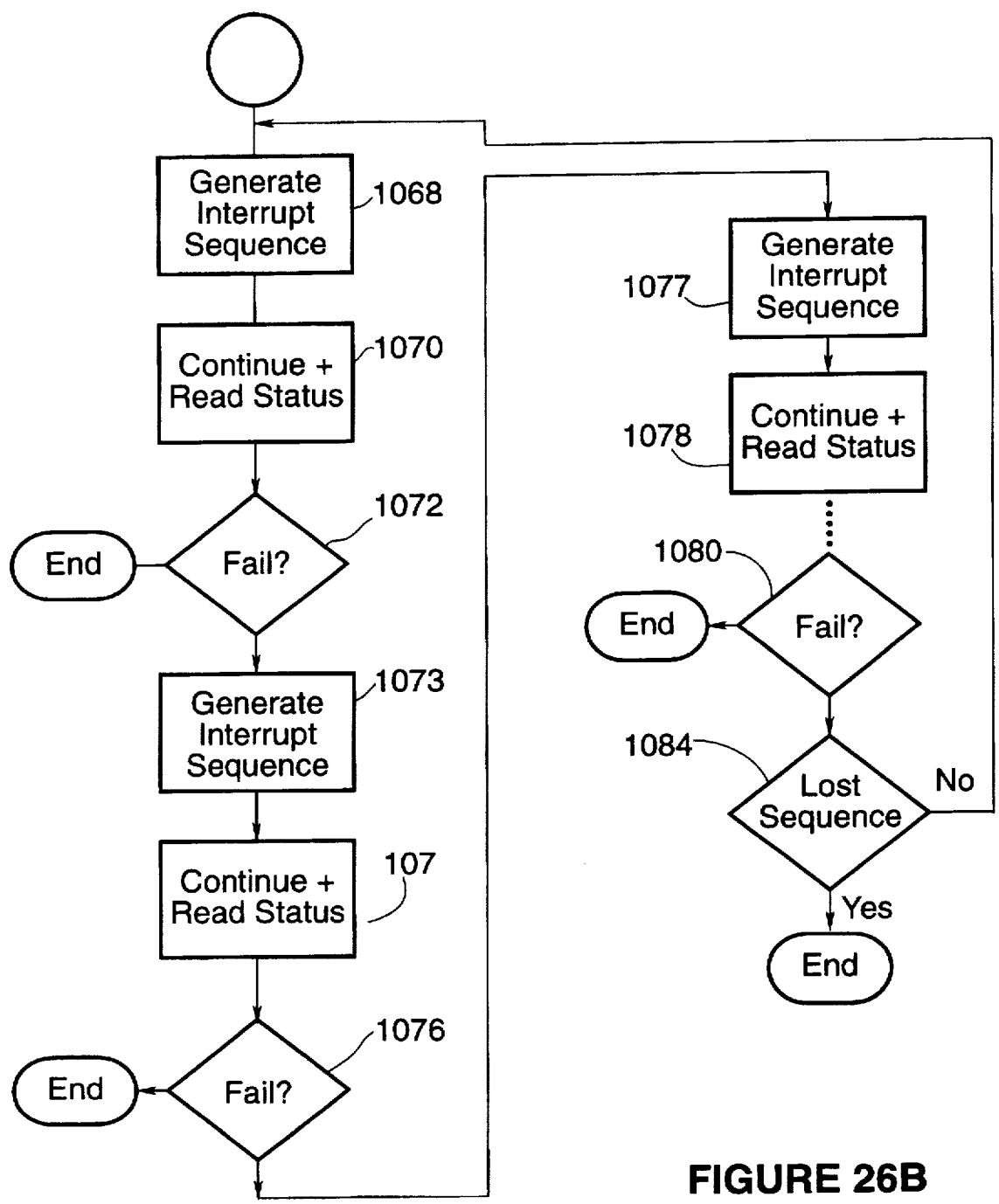

Turning now to FIGS. 26a and 26b, there is shown a more detailed flow chart of a test process employing the register-based mechanism. More particularly, the test process may include sequentially generating and testing individual interrupts, followed by sequences of interrupts. The process is initiated, with the test control register 1000 sending to stimulus controller and stimulus register 1002, 1003 the appropriate interrupt that is to be tested (step 1048 and 1050). The process may be halted after each test interrupt has been delivered and processed to read the status registers (step 1052). For example, step 1052 may include reading the test status registers at the output of the interrupt input processor 502, as well as reading the test status registers in the central controller 302 or the CPU channels, respectively. If, after the processing of any of the test interrupts, there is a failure of the controller as indicated by the appropriate status register read, the test will halt, allowing the tester to determine at which stage the failure occurred (Step 1054). Once a particular test interrupt has been successfully tested, the next test interrupt in the sequence will be generated (step 1055). Again, this interrupt will be processed, with the appropriate status registers being set in response thereto (step 1056). If there is a failure, the process will halt (step 1058), with the source of fault identified. If successful, the next interrupt in the sequence will be tested as above (steps 1059, 1060, 1062), and so on until each individual interrupt has been tested.

Once the individual interrupts have been successfully tested (step 1066), the test process will continue, and the test control register 1000 will initiate the generation of sequences of interrupts (step 1068). Again, the status registers at various stages in the testing of each interrupt sequence may be set (steps 1070, 1074, 1078), with the process halting prior to initiation (steps 1073, 1077) of the next sequence if a failure of the controller is detected (steps 1072, 1076, 1080). The process will halt upon successful completion (step 1084).

Figure 27:
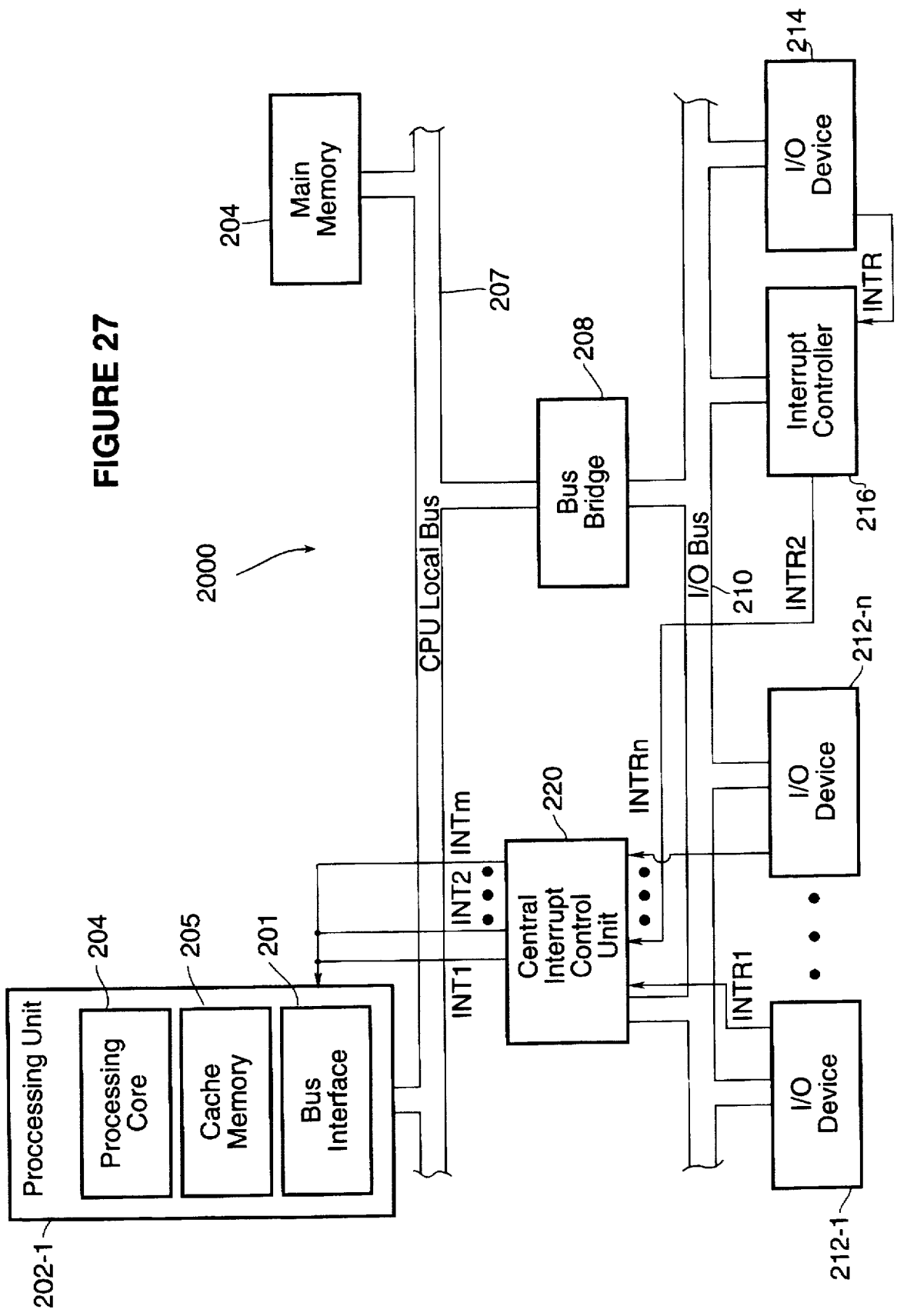
FIG. 27 is a block diagram illustrating use of a single processor to emulate a multiprocessing environment.

A test system as described above may require the use of a multiprocessing environment to monitor the interrupt testing. However, a further refinement of the test mechanism described above obviates the need to use a multiprocessing environment to confirm the test of the multiprocessing interrupt controller. More particularly, turning now to FIG. 27, there is shown a computer system 2000 in which a single processor 202-1 is configured to control and test the operation of a central interrupt control unit 220. Computer system 2000 is similar to computer system 200 shown in FIG. 2, except that interrupt lines INT1 through INTm are coupled to a single processor 202-1, rather than distributed among a plurality processors. It should be noted that it is not necessary that each of the processors 202-2 through 202-m shown in FIG. 2 be physically absent; rather, as will be discussed in more detail below, it is sufficient that the interrupt lines INT1 through INTm be coupled to a single processor, designated the master test processor. Thus, FIG. 27 is exemplary only.

Master test processor 202-1 enables and controls entry into the test mode described above. Master test processor is responsible for initiating the stimulus interrupts, as well as verification of test results. On system reset, master test processor 202-1 will assume control of the test. It will initialize any interrupts as well as deactivating other processors (if present). Master test processor 202-1 is able to interpret the CPU channel codes that have been described above (for all processors). Master test processor 202-1 further is able to respond to reception of an interrupt with the appropriate processor acknowledges. In this way, master control processor emulates the functioning of the other processors. Master test processor may also be configured to generate the interrupt acknowledges and receive the interrupt vectors that are directed to the other processors.

Figure 28:
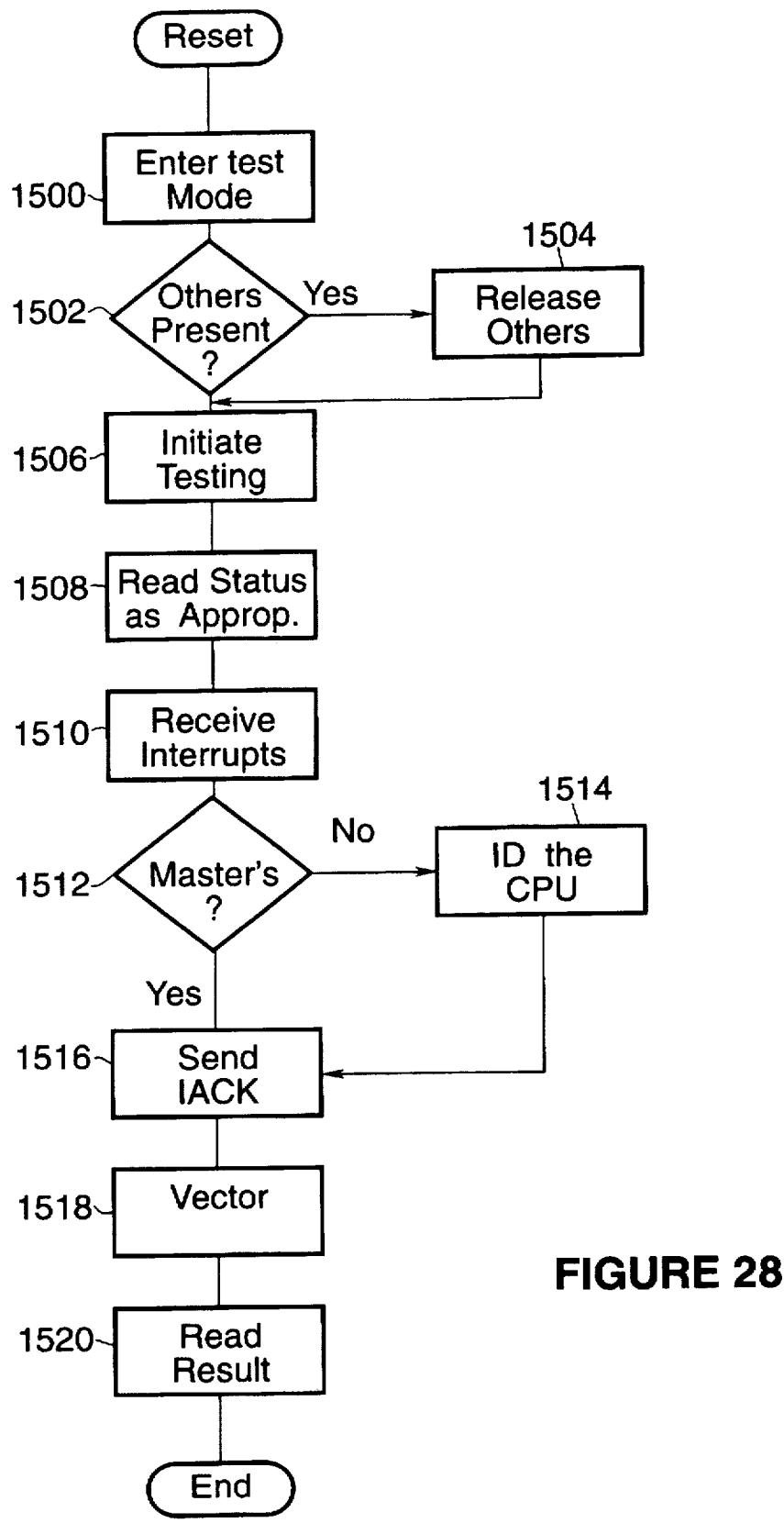
FIG. 28 is a flow chart of a method of testing a multiprocessing interrupt controller employing a single processor to emulate a multiprocessing environment.

Turning now to FIG. 28, there is shown a flow chart of a test process controlled by a single processor. Upon reset, the master test processor may enter a test mode (step 1500). While in test mode, the master test processor will determine whether or not other processors are present in the system (step 1502). If other processors are detected, the master test processor will release the others (step 1504) so as to proceed with the simplified testing of the multiprocessing interrupt controller. Once the extra processors have been released, the master test processor will initiate the actual test procedure, which may include generating test interrupts using the register-based system described above (step 1506). The master test processor will read status registers, if any, as appropriate (step 1508). Once the interrupts have propagated successfully through the interrupt controller, the master test processor will receive the interrupts (step 1510). If the interrupt happens to be directed toward the master test processor, the master test processor will send its own interrupt acknowledge (step 1516) and receive the interrupt vector (if the controller is functioning properly).

If, however, the interrupt is directed to one of the released processors, the master interrupt controller will identify the CPU and intercept the interrupt (step 1514). The master test processor will, in turn, return the interrupt acknowledge that the released CPU would have returned. Similarly, the master test processor will receive the interrupt vector and otherwise process the interrupt. Finally, the master test processor will continue to monitor and read the test results (step 1520).

While the above description of multiprocessor simulation for testing has centered on the use of the test register configuration described earlier, it is noted that the multiprocessor simulation is not so limited. More particularly, the multiprocessing simulation environment may be employed with the more traditional external test stimulus, as well as the internal test register stimulus described above.

Numerous variations and modifications will become apparent to those skilled in the art once the above disclosure is fully appreciated. It is intended that the following claims be interpreted to embrace all such variations and modifications.

What is claimed is:

1. An interrupt control unit for a symmetrical multiprocessing system, comprising:
    a plurality of interrupt input channels for receiving interrupt signals;
    a plurality of interrupt output channels configured to provide said interrupt signals to a plurality of processors;
    a central interrupt controller operatively coupled to said plurality of interrupt input channels and configured to selectively provide a given interrupt signal to one of said plurality of interrupt output channels; and
    a testing mechanism configured to provide test interrupt signals to said plurality of interrupt input channels simulative of said interrupt signals.

2. The interrupt control unit of claim 1, wherein said testing mechanism includes at least one test control memory unit configured to control which of said plurality of test interrupt signals is provided.

3. The interrupt control unit of claim 2, wherein said test control memory unit is a test control register.

4. The interrupt control unit of claim 3, wherein said testing mechanism further includes a test stimulus unit configured to provide said test interrupt signals responsive to a bit in said test control register being set.

5. The interrupt control unit of claim 4, wherein said test stimulus unit includes a test stimulus storage unit.

6. The interrupt control unit of claim 5, wherein said test stimulus storage unit is a test stimulus register.

7. The interrupt control unit of claim 2, wherein said test control memory unit controls which of said plurality of test interrupt signals is provided responsive to a command from at least one processor in said symmetrical multiprocessing system.

8. The interrupt control unit of claim 7, wherein said testing mechanism further includes at least one test status storage unit readable by said at least one processor and configured to provide test status information to said processor.

9. The interrupt control unit of claim 8, wherein said test status storage unit is a test status register.

10. A multiprocessing system comprising:
    a plurality of processing units;
    a plurality of I/O devices;
    a central interrupt control unit operatively coupling said plurality of processing units and said plurality of I/O devices, wherein said central interrupt control unit is configured to receive interrupt signals from said plurality of I/O devices and is configured to distribute said interrupt signals to said plurality of processing units; and wherein said central interrupt control unit includes means for providing at least one signal simulative of at least one of said interrupt signals; and
    a testing mechanism configured to provide test interrupt signals to said central interrupt control unit simulative of said interrupt signals.

11. The multiprocessing system of claim 10, wherein said providing means includes at least one test control memory unit configured to control which of said test interrupt signals is provided.

12. The multiprocessing system of claim 11, wherein said test control memory unit is a test control register.

13. The multiprocessing system of claim 12, wherein testing mechanism further includes a test stimulus unit configured to provide said test interrupt signal responsive to a bit in said test control register being set.

14. The multiprocessing system of claim 13, wherein said test stimulus unit includes a test stimulus storage unit.

15. The multiprocessing system of claim 14, wherein said test stimulus storage unit is a test stimulus register.

16. The multiprocessing system of claim 11 wherein said test control memory unit controls which of said plurality of test interrupt signals is provided responsive to a command from at least one processor in said multiprocessing system.

17. The multiprocessing system of claim 16, wherein said testing mechanism further includes at least one test status storage unit readable by said at least one processor and configured to provide test status information to said processor.

18. The multiprocessing system of claim 17, wherein said test status storage unit is a test status register.

* * * * *